(12) United States Patent
De Kezel et al.

(10) Patent No.: US 8,990,409 B2
(45) Date of Patent: Mar. 24, 2015

(54) SYSTEMS AND METHODS FOR ENABLING ANONYMOUS COLLABORATION AMONG MEMBERS ALONG VALUE CHAINS

(71) Applicant: Agor Services BVBA, Antwerp (BE)

(72) Inventors: Jan M. De Kezel, Antwerp (BE); Kurt Marcelis, Herne (BE)

(73) Assignee: Agor Services BVBA (BE)

( * ) Notice: Subject to any disclaimer, the term of this patent is extended or adjusted under 35 U.S.C. 154(b) by 0 days.

(21) Appl. No.: 14/272,082

(22) Filed: May 7, 2014

(65) Prior Publication Data
US 2014/0244773 A1 Aug. 28, 2014

Related U.S. Application Data

(60) Division of application No. 14/036,710, filed on Sep. 25, 2013, now Pat. No. 8,738,720, which is a continuation of application No. PCT/EP2012/003507, filed on Aug. 17, 2012.

(60) Provisional application No. 61/525,487, filed on Aug. 19, 2011.

(30) Foreign Application Priority Data

Sep. 13, 2011 (EP) .................................... 11181058

(51) Int. Cl.
*G06F 15/16* (2006.01)
*H04L 12/58* (2006.01)
(Continued)

(52) U.S. Cl.
CPC .............. *H04L 51/04* (2013.01); *G06Q 10/107* (2013.10); *G06Q 10/08* (2013.01); *G06Q 10/101* (2013.10); *G06Q 10/103* (2013.01)
USPC ........... 709/227; 709/204; 709/206; 709/251; 705/300

(58) Field of Classification Search
CPC . H04L 12/58; H04L 12/1813; H04L 12/1822; H04L 51/04; G06Q 10/107; G06Q 10/101
USPC ................. 709/202–207, 227–228, 248–251; 705/300, 319
See application file for complete search history.

(56) References Cited

U.S. PATENT DOCUMENTS 7,340,442 B2    3/2008  Jeanblanc et al.
8,135,786 B2 *  3/2012  Supakkul et al. ............. 709/206
(Continued)

OTHER PUBLICATIONS

International Search Report for International Application No. PCT/EP2012/003507, dated Nov. 15, 2012.

*Primary Examiner* — Bharat N Barot
(74) *Attorney, Agent, or Firm* — Sean D. Detweiler, Esq.; Morse, Barnes-Brown & Pendleton, P.C.

(57) ABSTRACT

The invention concerns a computer-implemented collaboration platform comprising:
  means enabling an initiator (158) to create a message (168);
  means enabling the initiator (158) to invite a group of first degree partners (160, 162, 164) to respond to the message (168);
  means enabling a first degree partner (162) to create a sub-message (170, 172);
  means adapted to automatically create a link between the sub-message (170) and the message (168), or between the first degree partner (162) and the initiator (158), or between collaboration spaces established for the sub-message (170) and the message (168); and
  means enabling the first degree partner (162) to invite a group of second degree partners (176) to respond to the sub-message (170) while concealing identities of one or more first degree partner (158, 160, 164) for the group of second degree partners (176), and/or vice versa concealing identities of one or more second degree partner (176) for the group of first degree partners (158, 160, 164).

9 Claims, 21 Drawing Sheets

(51) Int. Cl.
*G06Q 10/10* (2012.01)
*G06Q 10/08* (2012.01)

(56) References Cited

U.S. PATENT DOCUMENTS 8,407,356 B1 * 3/2013 Marks ........................... 709/206
8,763,140 B2 * 6/2014 Marcus et al. ................. 709/227
2001/0047276 A1 11/2001 Eisenhart
2002/0194267 A1 * 12/2002 Flesner et al. ................. 709/203
2008/0109447 A1 5/2008 Mathur
2009/0300725 A1 12/2009 Carney
2010/0198919 A1 * 8/2010 Supakkul et al. .............. 709/206
2011/0093539 A1 4/2011 Laurin et al.

* cited by examiner

FIG. 14B

SYSTEMS AND METHODS FOR ENABLING ANONYMOUS COLLABORATION AMONG MEMBERS ALONG VALUE CHAINS

RELATED APPLICATION

This application is a divisional of, and claims priority to and the benefit of, co-pending U.S. Non-Provisional application Ser. No. 14/036,710, filed Sep. 25, 2013, which is a continuation of, and claims priority to and the benefit of, co-pending PCT Application PCT/EP2012/003507, filed Aug. 17, 2012, which claims priority to, and the benefit of, European Application No. 11181058.6, filed Sep. 13, 2011, and U.S. Provisional Application No. 61/525,487, filed Aug. 19, 2011, for all subject matter common to these applications. The disclosures of said applications are hereby incorporated by reference in their entirety.

FIELD OF THE INVENTION

The present invention generally relates to collaboration between partners which typically represent different individuals or entities in a value chain, e.g. a business supply chain or design/development team. Whereas the different partners in a value chain have to collaborate on various issues, it is not always obvious or known to the initiator who has to be involved to solve a problem, certain confidentiality may have to be respected, and it may be desired to keep the identities of certain individuals or entities in the value chain anonymous. The present invention therefore relates to a platform (or system) and a method that enables optionally anonymous/confidential collaboration between connected teams and a convenient way of involving additional individuals or entities to collaborate in a self-directing collaborative community without necessarily disclosing their identity and/or without disclosing the identity of partners that are already involved in the collaboration.

BACKGROUND OF THE INVENTION

In value chains, e.g. supply chains, there are many individuals and entities, called partners throughout this patent application, serving a variety of roles and functions. In many instances, issues arise that require the knowledge and expertise of such partners in the supply or value chain. Often however, there exists a desire to conceal or keep hidden the identities of individuals and/or entities in the supply or value chain because the identity of these individuals and/or entities represents important know-how of another partner in the value chain. In the example where manufacturer A receives component parts from company B, and company B receives its materials for those parts from company C, company B may wish to keep the identity of company C concealed from manufacturer A to avoid that manufacturer A would decide to reduce costs by cutting out the middleman, i.e. company B in this example, and make the parts itself with material supplied by company C. In addition, companies B and C may be less likely to suggest innovative or new ideas if company A is actively or even passively involved in the brainstorming process. This can diminish the creativity of companies B and C, thereby weakening the value of their proposed solutions.

The knowledge to solve an issue or question, is often hidden in the value chain, in a sense that the initiator of a question/issue does not know the person who has the knowledge to answer. In the example above, Manufacturer A may have a question about the part received from company B, but does not know who needs to be involved to answer the question. It may be company C or even company D, a supplier of company D, etc. In many value chains, companies have no insight in their supply chains. Thus, to respond a question/solve an issue, one needs several parties to work together, while no single party involved would be able to tell who the entire team is. It must be possible to establish the team solving the issue organically, as each member of the value chain may involve just one other member to get access to the knowledge to solve the issue. The same is true for the sales side: if company A needs to solve a question about the use of their products by end-users, they may need to find the answer through the customers who on their turn invite other members downstream (or other stakeholders/partners) of the value chain.

The desire to maintain anonymity/confidentiality often hinders an individual or entity's ability to reach a solution to a particular problem. This is in particular the case when reaching such a solution requires collaborative involvement and knowledge of partners at different points along a supply or value chain. In many situations, creative initiatives, solutions, and business plans are quashed by the inability to transfer information in an efficient manner, enabling the anonymity of the various sources of information to be respected, and enabling the confidentiality of the exchanges of anonymous or known sources to be respected without sacrificing knowledge of the credibility or reliability of such sources.

Existing platforms that enable collaboration between partners in a value chain can be categorized as e-mail based platforms, project management systems, community platforms, ticketing systems, or supplier relationship management (SRM) systems. All of these existing platforms are disadvantageous as will be explained in more detail below. In particular, none of these existing platforms enable a partner in the value chain enable to involve second tier or second degree partners on a problem or sub-problem while keeping the identities of certain first tier partners hidden for such second degree partner and vice versa. Also, these systems typically do not allow members to invite others to become members at their discretion, and thus do not allow to really operate as self-directive connected virtual teams.

Collaboration platforms based on e-mail enable an initiator to create a message, eventually with attachments such as Excel files or Word documents. The initiator can send the message to a group of first degree partners and invite them to respond to the message. A first degree partner can forward the e-mail message to a second degree partner, not known or directly linked to the initiator of the message, when it is believed that collaboration or assistance of such second degree partners is desired in order to be able to respond to the initial message.

Although e-mail platforms allow to structure messages through forms, enable to insert a due date for a task or response, and feature forwarding capabilities, the link between message and response is rather weak. Usually, this link is established through the title or subject of the e-mail message and gets lost as soon as one partner in the forwarding chain tampers with these fields. E-mail based platforms further do not allow to prevent forwarding the identity of the initiator or other first degree partners. In the reverse direction, e-mail does not enable to prevent disclosing the identity of the second degree partner(s) that sourced part of the response. E-mail is further disadvantageous in that it does not enable to split a message or list in sub-messages thereby maintaining a link between the different elements of the message or list.

Project management systems are software platforms that allow to manage tasks within an organization, typically a corporate entity where cross-department collaboration is required. Project management systems enable to send tasks to users within a closed working environment. It is not possible for users of a project management system to invite additional, external individuals/entities, i.e. second level partners, to collaborate. Although project management systems allow splitting a task into sub-tasks and creating a team per sub-task, it is not possible to copy and forward a task or sub-task to have a different team work on the sub-task while keeping the identities of the initial team and the different team hidden to each other. Project management systems are further disadvantageous because they are designed and developed to manage tasks only. They do not allow handling of the related data structures such as structured information, questions, issues, ideas, tables, lists, etc.

Collaboration community platforms are web applications that enable users to invite others for collaboration with respect to a topic. Such platforms deliver collaboration tools like a chat tool, a web-based discussion space, audio/video conference tools, etc. to exchange ideas. It is however not possible to manage confidentiality within a collaboration community. The users cannot hide identities of first or second tier partners, and it is impossible to control the extent to which a user is allowed to forward information that is shared within such community. The known collaboration community platforms hence do not enable to conveniently split a message or inquiry in sub-messages, forward sub-messages to different teams while maintaining a link between the sub-messages and the initial message, and controlling confidentiality and concealment of identities of the partners between the different teams.

Ticketing systems are developed and used to facilitate operations and build knowledge of a support organization. Such systems enable to forward a message, i.e. an inquiry or issue, to other users, and to maintain a history list of already solved issues and responded messages.

Ticketing systems are however designed to constitute closed user systems as a result of which it is not possible to invite individuals from external organizations or entities to collaborate on an issue. The users of ticketing systems typically work in small teams. They forward a ticket from one user to another. It is not possible to generate lists or split tickets in sub-tickets and maintain a link between the initial ticket and eventual sub-tickets in order to enable different teams/users to work on sub-tickets and finally send back the solutions to sub-tickets back to the initiator. It is for sure also not possible in ticketing systems to forward tickets/sub-tickets while hiding the identity of for instance the initiator to the teams/users that are working on the forwarded ticket or sub-ticket. Ticketing systems are further limited in their ability to structure information that is shared: usually, a free text solution augmented with a description field is provided for messaging.

Supplier relationship management (SRM) systems provide functionality enabling to collect complex information from suppliers in the value chain of a company. SRM systems are typically used to distribute surveys/inquiries to different potential suppliers, follow-up and report on the comparison between the survey responses received from different potential suppliers. The contacted suppliers however cannot create an own workspace in such SRM system, copy inquiries or sub-inquiries and invite others to collaborate in responding to an inquiry. The SRM system and all information shared therein is owned and controlled by the buyer of the platform. This entity exclusively decides who can join and use the SRM platform. As a consequence, SRM platforms do not enable a flow of information/inquiries across plural levels of the supply chain.

In summary, there is a need for systems and methods that enable anonymous collaboration among different partners, e.g. individuals, entities, etc., of a supply or value chain relating to a message, e.g. an inquiry, issue, idea, etc., without sacrificing knowledge of the credibility or reliability of the information/response to the message. Existing e-mail platforms, project management systems, collaboration community web applications, ticketing systems, and SRM systems fail to provide an adequate solution.

The growing need for an environment where collaborators can share information and work without knowing each other's identity or contributions was already recognized in July 1994 in the article "Anonymous Collaboration: An Alternative Technique for Working Together" from author Andrew Lee. This article was published in SIGCHI Bulletin, Volume 26, Number 3, pages 40-46. Besides recognizing the problem and need for such environment, Andrew Lee also describes an ANOC (Anonymous Collaboration) based software tool that supports non real-time electronic discussion (page 43) and group authoring (page 45), but the described software rather implements a bulletin board wherein all contributors remain anonymous. This downgrades the credibility/reliability of the information. In many cases, such as for instance the question if a plastic toy contains potentially harmful plasticizers, the initiator of the question does need to receive the answer from a named/identified supplier, not from an anonymous source.

The closest prior art solution, United States Patent Application US 2011/0010425 entitled "Techniques for Enabling Anonymous Interactive Communication" and published on 13 Jan. 2011, describes a platform enabling two-way communication between parties wherein one party remains anonymous. In these systems, each party or user is assigned a non-anonymous ID and an anonymous ID. A first user can issue an electronic message or inquiry to a second user from his anonymous ID. The response from the second user addressed to the anonymous ID of the first user will be sent to central system that forwards the response to the first user without disclosing the identity of the first user to the second user. As is indicated by paragraph [0014] of US 2011/0010425, a message received by the second user (first tier partner) can be forwarded to a third user (second tier partner). Again, the second user can forward the message using his anonymous ID to thereby prevent disclosing his identity.

The system known from US 2011/0010425 is designed to increase effectiveness of surveys or campaigns (see paragraph [0003]). It requires assigning to each user two IDs upon registration: a non-anonymous ID and an anonymous ID. Each user can control concealment of his own identity by using his anonymous ID when sending/forwarding a message but it is not possible to conveniently control hiding the identities of other partners when forwarding messages or sub-messages across several tiers of the value chain. In other words, a company cannot hide the identities of its distributors when consulting its suppliers, unless these distributors have taken preventive actions to avoid disclosing their identities. The platform of US 2011/0010425 also does not enable to invite new, external partners to contribute, and it does not maintain a link between the initial message and forwarded messages/sub-messages. The system relies on the non-anonymous IDs and anonymous IDs of users to ripple back the responses to the initiator.

It is an objective of the present invention to disclose a platform and method for enabling anonymous collaboration between partners in a value chain that overcomes the above mentioned shortcomings of existing solutions. More particularly, it is an objective to disclose a collaboration platform and method that enable optionally anonymous/confidential collaboration between different partners of a supply or value chain without sacrificing the credibility or reliability of the information shared. It is a further objective to disclose such platform and method wherein a partner can conveniently create a message or sub-message and invite second level partners, not directly known by or linked to the initiator, to contribute thereby respecting the desire to hide the identities of certain partners when transferring messages/responses across different levels in the value chain. The present invention is directed towards technical solutions that address this and other needs, in addition to having other desirable characteristics that will be appreciated by one of skill in the art upon reading the present specification.

SUMMARY OF THE INVENTION

According to the present invention, the above defined objectives are realized by a computer-implemented collaboration platform as defined by claim 1, the platform comprising:

- means enabling an initiator to create a message;
- means enabling the initiator to invite a group of first degree partners to respond to the message;
- means enabling a first degree partner of the group of first degree partners to create a sub-message;
- means adapted to automatically create a link between the sub-message and the message, or between the first degree partner and the initiator, or between collaboration spaces established for the sub-message and the message; and
- means enabling the first degree partner to invite a group of second degree partners to respond to the sub-message while concealing identities of one or more first degree partner for the group of second degree partners, and/or vice versa concealing identities of one or more second degree partner for the group of first degree partners.

Thus, the platform according to the invention provides an interface enabling a user, named the initiator, to create message and transmit this message to a group of known first degree partners. It is noticed that such group can consists of one or plural first degree partners. The message can contain an idea, request, inquiry, statement, table, list or other structured information and typically requires a response that will result from collaboration. The structured information could be quite complex, like for instance an xml file defining the chemical characteristics of a product or the life cycle assessment data of a product or process. Collaboration for completing/reviewing/amending the xml file may for example be requested. A first degree partner that receives the message from the initiator can create a sub-message that is automatically linked through the platform with the initial message where it is derived from. Technically, the message is copied into the sub-message, and a link is kept between the sub-message and the message out of which the sub-message was created, or between the partners exchanging the message, or between the collaboration spaces established for the message and sub-message. The link between message and sub-message (or between partners or collaboration spaces) may for instance be maintained in a relational database or any other database system that forms part of the platform. The sub-message can be an exact copy of the message or a modified version, e.g. a selection of information, an amended version, a complemented version, a partial inquiry, etc. The owner of the sub-message is the first degree partner who created it. The sub-message is forwarded to second degree partners, typically not known by the initiator and not known by the other first degree partners. Again, the group of second degree partners can consists of one or plural second degree partners. The first degree partner creating the sub-message has the ability through his interface to the platform to conceal the identities of the initiator and one or more other first degree partners. Vice versa, the first degree partner creating the sub-message has the ability to conceal the identities of second degree partners for first degree partners. This way, business relations in the value chain can be protected: a product developer for instance may not want to reveal the identity of its suppliers to the client and it may not want to reveal the identity of its clients to the suppliers. The first degree partner however cannot conceal his own identity since he represents the point of trust and guarantee for credibility when inviting second level partners. The initial message, sub-messages and responses are all linked through the database maintained centrally. Each partner has the ability to consult his trusted/reliable network of further degree partners in the value chain but does not have to disclose the identities of the consulted partners. This way, the reliability and credibility of the collected information remains intact while the platform offers partners in the value chain the possibility to collaborate without disclosing core knowledge such as the identities of partners in other tiers of the value chain.

It is noticed that the first degree partner obviously acts as initiator for the sub-message he created. This sub-message can similarly be forwarded by a second degree partner who can invite further degree partners in the value chain to collaborate. This way, collaboration using the platform according to the present invention shall typically result in a chain of messages, sub-messages and responses that are automatically linked and able to be consolidated into a response for the initiator to the initial message. Identities can be concealed in cross-level transfers along the value chain, whilst each contributor still feeds back his response to a known partner thereby guaranteeing that reliable and credible information is collected.

According to a further aspect of the computer-implemented collaboration platform according to the current invention, the initiator, the first degree partners and the second degree partners are partners of a value chain.

Indeed, although the platform according to the invention is useful in any situation or environment where partners must collaborate without disclosing each others identities and/or where collaboration needs to be organized by self-directive teams who decide independently whom to invite to solve a problem, the invention is in particular advantageous when used for collaboration between partners in a business value chain, e.g. a supply chain. This is so because the entities in such supply chain consider knowledge of the identities of their respective partners as a key asset. They prefer not to share this information with other partners whereas they may wish to involve these partners in the collaboration in order to resolve an issue. When used for collaboration between partners in a business value chain, the current invention shall accelerate innovation of products and services. Whereas information exchange across companies in the value chain is a bottleneck today, the current invention shall enable companies to collaborate faster and easier.

It is noticed that partners in the context of the current invention must be interpreted broadly, covering e.g. business partners, stakeholders, consumers and customers, researchers or designers participating in the development of a product, NGO's or interest groups that have concerns about a product or company, sector organizations, etc. The value chain is in this context broader than only those entities or individuals who touch the product during production.

According to a further aspect of the computer-implemented collaboration platform according to the current invention, the sub-message is either:
- a copy of the message;
- a copy of part of the message;
- a modified copy of the message;
- a modified copy of part of the message; or
- a related message.

Indeed, a first degree partner receiving a message from the initiator, may forward this message in unmodified version or modified version to a number of second degree partners that he likes to involve in the collaboration. The message may be forwarded entirely or only part of the message may be copied into the sub-message. The platform this way allows a partner to split a message into different related sub-messages and to forward these sub-messages to different groups of second level partners. The sub-message may also be a related message. The question if a doll contains a harmful plasticizer may for instance lead to a sub-message requesting information on the recipe for manufacturing the hair of the doll. Such related message is no longer a modified copy of the initial message but still a question that is originated by/derived from the initial message.

Optionally, the computer-implemented collaboration platform according to the current invention may comprise:
- means enabling the initiator to add attributes to the message.

By adding attributes to a message, the goals and boundaries of the messages worked on by several teams or groups along the value chain remain clear even when the identities of the teams or partners in the teams are not known to the initiator. As a consequence, everyone, even several degrees separated from the initiator, shall remain focused on the goal and stay aware of critical information that is communicated through the attributes of a message.

In one embodiment, the attributes may comprise a due date for responding to the message.

The due date is the date by which the initiator expects or needs a response. The due date will be copied automatically whenever a linked sub-message is forwarded to a new team or group of further level partners. The partner creating the sub-message however can modify the due date, e.g. select an earlier date in case time is needed to return the response to the initiator once the second degree partners or third degree partners have responded.

In another embodiment, the attributes may comprise a legal context for the message.

Issues or messages that require collaboration may have a legal dimension. In such case it may be important that second degree partners, third degree partners, etc. are made aware of the legislation and eventual compulsory date resulting from such legislation. Advantageously, messages that have such legally compulsory due date will have this explicitly mentioned in an attribute in such a manner that second degree partners, third degree partners, etc. understand the urgency and legal requirement to respond.

In yet another embodiment, the attributes may comprise a business context for the message.

Indeed, when individuals or entities that have to respond to a message do not have direct contact with the initiator of the message, there is a risk that their interpretation or perspective is different from the initiator's as a result of which they may respond in a way that is not helpful or even misleading. By adding a business context to the message and by default copying the business context into corresponding attributes of sub-messages that are linked with the message, the risk for misinterpretation and consequently the efficiency in collaborating through the platform according to the invention is further improved. Business context in relation to the current invention must be interpreted broadly, covering for instance also certain expertise. For instance, the business context may reveal how the impact of a product on health must be calculated in order to assist a supplier in making correct calculations.

It is noticed that although the attributes of a due date, legal context and business context are mentioned here above to form part of different embodiments, any skilled person will understand that two or more of these attributes may be combined into a single embodiment of the platform according to the invention. Obviously, the list of attributes that may be added to a message is also not necessarily limited to the examples given here above.

According to a further optional aspect, the computer-implemented collaboration platform according the current invention may comprise:
- means enabling an initiator to create a list of messages containing the message; and
- means enabling the initiator to invite a group of first degree partners to respond to the list of messages.

Thus, the platform according to the invention also enables teams to collaborate on a list of messages, e.g. a list of ideas, a list of questions, a project consisting of a list of issues, questions, tasks, ideas, etc. An initiator can create lists of messages, and partners can forward the entire lists and invite other teams to work on the entire lists. A partner can also forward one message out of a list and invite a team or group of second degree partners to collaborate on it. A partner can also create a new list out of one message. A message or inquiry may for instance lead to a list of sub-questions and tasks. A partner can also take a sub-list of messages, create therewith a new list and invite a team of second degree partners to work on the new list.

According to a further aspect of the computer-implemented collaboration platform according to the current invention, the platform comprises:
- means enabling the second degree partners to respond to the sub-message.

Indeed, the second degree partners that are invited by a first degree partner to collaborate on a sub-message will have an interface to the platform that enables them to respond to the received sub-message. Their response will also be linked automatically and centrally to the sub-message and consequently also to the initial message, such that the first degree partner that created the sub-message can easily integrate the response received from the second degree partner in the response to the initiator.

According to yet another aspect of the invention, the computer-implemented collaboration platform according to the invention further comprises:
- means enabling the first degree partner to respond to the message thereby integrating one or more response received from one or more second degree partner to one or more sub-message linked to the message, while concealing identities of one or more second degree partner.

Thus, when receiving responses from second degree partners and integrating these responses in a final response to the initial message of the initiator, the first degree partner shall respect the anonymity of the contributing second degree partners and conceal the identities thereof.

Optionally, the computer-implemented collaboration platform according to the current invention may further comprise a client work module comprising:
- graphical user interface elements adapted to present options on inbound messages;

graphical user interface elements adapted to present options on outbound messages;

graphical user interface elements adapted to present options on inbound responses; and graphical user interface elements adapted to compose an outbound response.

Thus, the client work area where users of the platform manage the messages and lists they are working on, are arranged in such a manner that when a response to a message or sub-message is available to the user, the related message or sub-message where the response is linked to will automatically appear on the user's screen. At the same time, the platform presents options on the received response or message.

The options presented by the platform according to the current invention on inbound responses may comprise:

copying the inbound response to an outbound response; and/or modifying and copying the inbound response to an outbound response; and/or editing or creating an outbound response with the use of a related inbound response in a side-by-side window.

Thus, the options presented to the user receiving a response to a message from a contributing partner can include copying the response as is into a response to the linked message and sending it in the value chain in the direction of the originating message. Another option presented to the user receiving a response to a sub-message could be amending and copying the response into a response to the linked message, and forwarding that response up in the value chain towards the initiator of the message.

Also optionally, the computer-implemented collaboration platform according to the current invention may comprise a client library module comprising:

means adapted to store a user-specific history of inbound and outbound messages and responses.

This way, users of the platform will have access to their own library of previously responded messages, previously submitted responses, and eventually also information they can upload. While preparing a response to a message, users will be able to search through previous messages and responses. Through the library, users will also be given the opportunity to upload structured information, like for instance a bill of material of a product, in order to be able to easily respond to certain expected questions like a request to specify how much of a particular substance is present in a product. Such information would for instance be loaded from a structured file that contains product numbers, part numbers, their components and ingredients, the weight percentage of these components, etc. A further public library could—as a non-limitative example—contain all chemicals covered by REACH, RoHS, Electronic Waste, FDA or other directives, and their characteristics.

In addition to a platform, the current invention also relates to a corresponding method for anonymous collaboration, the method comprising the steps of:

creating a message by an initiator;

the initiator inviting a group of first degree partners to respond to the message;

a first degree partner of the group of first degree partners creating a sub-message;

automatically creating a link between the sub-message and the message, or between the first degree partner and the initiator, or between collaboration spaces established for the sub-message and the message; and the first degree partner inviting a group of second degree partners to respond to the sub-message while concealing identities of one or more first degree partner for the group of second degree partners, and/or vice versa concealing identities of one or more second degree partner for the group of first degree partners.

BRIEF DESCRIPTION OF THE DRAWINGS

FIG. 14A-14C illustrate the work area or graphical user interface at different instances in the scenario illustrated by FIG. 13A-13I.

DETAILED DESCRIPTION OF EMBODIMENT(S)

Figure 1:
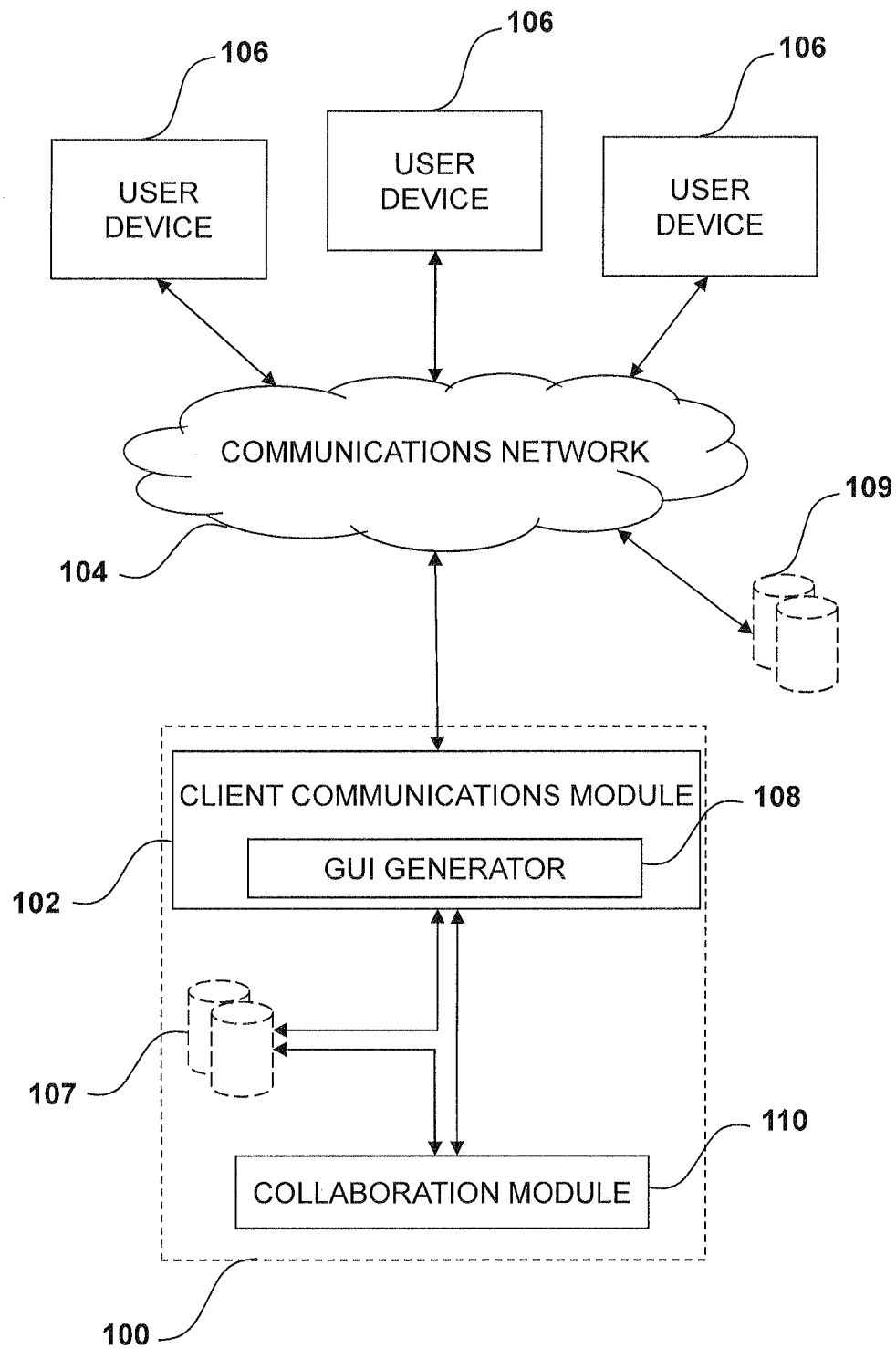
FIG. 1 is a schematic block diagram illustrating an example system for implementing one or more of the functions and features of embodiments of the collaboration platform according to the present invention.

An illustrative embodiment of the present invention relates to a computer implemented platform and associated method for enabling anonymous and/or confidential collaboration of individuals, experts, companies, partners, or the like, operating at multiple points along one or more supply or value chains. In particular, the platform and method disclosed herein provide a collaboration environment within which a group of invited value chain partners may interact, exchange information, and add contributions to solve a user-defined problem, or more generally, to address a message containing an idea, inquiry, structured information, etc. The partners invited to collaborate within a group may be given one or more permissions that enable or deny certain actions or information within the collaboration space, and which further control the access by each user to the message. In accordance with an example implementation of the present invention, the invited partners are anticipated to be members of a supply or value chain.

In particular, each partner that is invited to access the message can be enabled to anonymously (or not) create a new version of the message, a so-called sub-message. In creating such a new version, the platform automatically generates a new collaboration space, which can be maintained hidden and confidential from the partners of the initial group that was invited to collaborate on the initial message, if so desired. A partner that creates a new collaboration space is enabled to invite additional, second-level partners to access the sub-message through the collaboration space. For example, business partners further down the supply or value chain can be invited in order to provide additional input on inquiry sub-problem or sub-inquiry that is split off into the sub-message, while enabling the identity of these business partners to be concealed from the initial group of invited first-level partners, and vice versa. In each instance of a new version being created, the platform enables the new version to be either visible to or concealed from the members of the previous group.

As will be described in greater detail herein, a new version of a message or so called "sub-message" can include a sub-set of the message or a list of sub-messages that are related in some way to the message. For example, if an original inquiry from a distributor to a manufacturer of toys contains the question "Does a plastic doll contain harmful components?", then the manufacturer of the doll can be enabled to split the original inquiry into two related inquiries by creating two sub-messages. One sub-message can pose the following question to the supplier of the doll's hair: "Does hair of a plastic doll contain harmful plasticizers or other harmful components?". A second sub-message can pose the following question to the supplier of the resins for the plastic used to construct the doll: "Do resins used in a plastic doll contain harmful plasticizers?". Each sub-message will be considered by its receivers invited to contribute as a new message that can be further split or forwarded anonymously to second level groups or teams that are invited to contribute.

FIGS. 1 through 10, wherein like parts are designated by like reference numerals throughout, illustrate example embodiments of the platform and method for anonymous and/or confidential collaboration along supply or value chains, according to the present invention. Although the present invention will be described with reference to the example embodiments illustrated in the figures, it should be understood that many alternative forms can embody the present invention. For example, while example embodiments of the present invention are described herein with reference to partners interacting at various points of supply or value chains, it can be appreciated that such contexts, industries, or types of groups do not limit the present invention. As just one example, the systems and methods provided herein can allow customers or consumers of a business to generate inquiries. As yet further possibilities, stakeholders in a company can be allowed to utilize the system described herein to generate messages triggering collaboration with respect to new innovations. One of ordinary skill in the art will appreciate different ways to alter the parameters of the embodiments disclosed, such as the particular arrangement and implementation of software modules by various computing environments, as well as other readily appreciated modifications, in a manner still in keeping equivalency with the present invention as defined by the appended claims.

FIG. 1 depicts an example platform 100 that can be implemented by a number of suitable computing environments, i.e. a combination of hardware and software, for enabling the collaboration of one or more users, i.e. partners in a value chain, in accordance with the present invention. In particular, the example platform 100 includes a client communications module 102, which can connect to a communications network 104, thereby enabling one or more users operating a user device 106, e.g. a workstation, personal computer, cellular telephone/device, laptop, smartphone, tablet PC, etc., to interact with and engage the functionality of the platform 100. It is noticed that the platform according to the current invention may also interact with other applications in the user's domain, e.g. the user's Enterprise Resource Planning (ERP), Product Lifecycle Management (PLM) or Customer Relationship Management (CRM) applications running on the user's device 106. As is indicated by the databases 109, the platform according to the present invention may also interact with other applications in the cloud, e.g. Life Cycle Assessment (LCA) databases, Google docs, Google Sketch, Google+, Skype, Facebook, etc. More specifically, the client communications module 102 can include a graphical user interface (GUI) generator 108, which can generate one or more GUIs comprising various displays of information. The platform 100 optionally can include one or more databases 107 in communication with the client communications module 102, the GUI generator 108, and/or the collaboration module 110. The databases 107 can store information and data managed and provided by the platform 100, as described in detail herein. Alternatively or additionally, the platform 100 can communicate through the communications network 104 with one or more databases 109 stored in the cloud, e.g., hosted or otherwise provided by a cloud storage provider.

The system 100 additionally includes a collaboration module 110, typically in communication with the client communications module 102, for enabling optionally anonymous collaboration between various groups of users, e.g. groups along different tiers of the supply or value chain. As a brief introduction, and as further described in detail herein, the collaboration module 110 can allow any of the following actions, in addition to other capabilities: (1) creating collaboration spaces; (2) creating messages; (3) creating concealed or visible sub-messages; (4) generating a link between a sub-message and either the original message or the existing sub-message from which the new sub-message was created; (5) sending access invitations that enable a user to access the message or sub-message via the collaboration space; (6) setting and changing one or more permissions of partners invited to access version message or sub-message thereof; (7) enabling users accessing a message or sub-message to post communication to a collaboration space; and (8) enabling responses to messages to be sent.

The user devices 106 can include any number of devices. As non-limiting examples, the user devices 106 can comprise one or more of the following: a laptop, a desktop, a hand-held device, a mobile device, a smart phone, a tablet computer, a portable transceiver, a set-top box, e.g. for internet TV, and any other suitable device as would be understood by those of skill in the art. As such, some or all of the features, components, and functions of the system 100, including the particular implementation of the collaboration spaces, can be customized to accommodate different and/or multiple types of devices 106 with which the platform 100 communicates. Furthermore, the platform 100 can be configured to interface with one or more other computing systems, social media websites, servers, and the like, to provide users with the capability to utilize the graphical user interfaces and collaboration spaces described herein to access various proprietary software applications, various plug-ins, various social media features, or any other tools, software, apps, information, databases, or data that is not entirely hosted by the platform 100.

For purposes of illustration, the example platform 100 is simplified and depicts the various modules and components as discrete functional blocks. However, one of skill in the art can appreciate that in actuality the lines of the modules and other components of FIG. 1 may not always be well defined. Rather, the modules and components can act as a unit in many instances. Accordingly, one of skill in the art will appreciate a number of ways to merge together or split apart the modules and components of FIG. 1, depending on the intended applications and the particular computing environment. Furthermore, in some embodiments, a module or component represented by only one block actually is implemented with multiple such modules or components. Additionally, components depicted as being contained within the platform 100 can be excluded from the platform 100, and components depicted as being excluded from the platform 100 can be incorporated into the platform 100. One of skill in the art will readily appreciate a variety of ways to expand, reduce, or alter the example platform 100. All such alterations and embodiments are considered equivalent variants of the present invention.

In general, the platform 100 enables collaboration among partners on inquiry message, via a collaboration space. The content of a message can be any question, inquiry, issue, idea, challenge, objective, or the like. In the context of a supply or value chain, the content of a message can be a particular problem on which a merchant user is seeking a solution. As one example, a donut manufacturer may be interested in determining how to manufacture gluten-free donuts. In general, the message can have virtually any format. For example, the message can be a media file, a document, a web page, data embedded in or presented by a web page, information in any form, or the like. For example, messages can be interactive or modifiable files, e.g. a fillable pdf file, and/or can contain one or more selectable fields/buttons, e.g. as a multiple choice question format. One of skill in the art will appreciate a broad range of ways to implement and format the messages described herein.

Figure 2A:
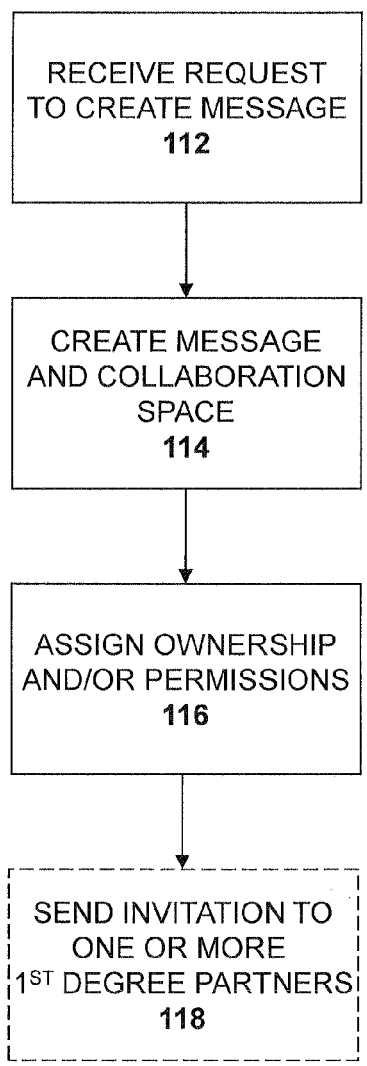
FIG. 2A is a flow chart depicting exemplary methods for creating messages according to aspects of the present invention.
Figure 2B:
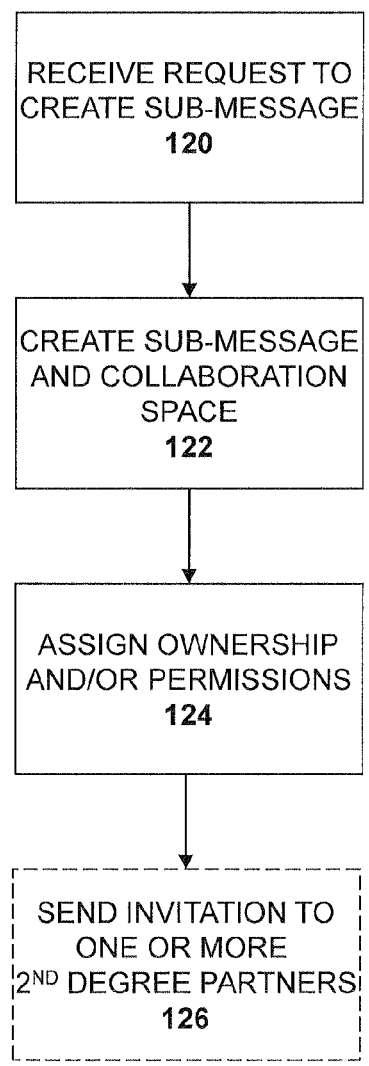
FIG. 2B is a flow chart depicting exemplary methods for creating sub-messages according to aspects of the present invention.

FIG. 2A and FIG. 2B depict example methods by which the platform 100 creates and controls access to respectively messages and sub-messages, and associated collaboration spaces. Each collaboration space is associated with a creating user, called the initiator, and either a message (FIG. 2A) or a sub-message (FIG. 2B). In general, sub-messages either are created from an initial message, or they are created from an existing or preceding sub-message. Thus, "sub-messages" as referred to herein generally can refer to messages derived from an initial message, messages derived from preceding sub-messages, and combinations thereof. As an example, supply chains in automotive manufacturing could easily by eight levels deep. In such a value chain, it could happen that over eight levels of sub-messages are generated if for instance an end-user or distributor initiates a message whose response ultimately requires collaboration of a supplier of a small part.

The client communications module 102 can receive a request from an initiator to create a message and associated collaboration space (step 112). The request can be transmitted from the initiator's user device 106 across the communications network 104 and can include information entered by the initiator into a GUI hosted by, embedded in, or otherwise provided by one or more web pages and generated by the GUI generator 108. In some embodiments, the message request (and resulting message) can include one or more predefined text or other types of fields or attributes containing information submitted by the initiator. For example, in such embodiments, the attribute fields can include any one or more of the following: a description field, a context field, a legal requirement field, a business requirement field, and a deadline field. Additionally or alternatively, a message can include a suggested response format containing one or more pre-defined fields, such as text fields, date fields, numeric fields, unit of measurement fields, tables, and the like.

Upon receipt of the message request, the collaboration module 110 can generate a collaboration space and create the message in the collaboration space from information contained in the message request (step 114). In accordance with embodiments of the present invention, the collaboration spaces described herein can be implemented in a number of ways. For example, the collaboration spaces can each comprise one or more web pages containing one or more GUIs generated by the GUI generator 108 that enable the interaction and various other features described herein. The web pages furthermore can be in communication with one or more databases containing the data, e.g. inquiries, versions of inquiries, assigned user permissions, chat records, discussion board posts, social media or public web pages where consumer can post feedback or question pertaining to a product etc., pertaining to the collaboration space. In some further embodiments, each collaboration space comprises at least one user-personalized web page per user with access to the message. Accordingly, the collaboration space need not be implemented in a manner that presents information associated therewith identically for each user. In fact, in some embodiments, a single web page can provide users with information pertaining to multiple collaboration spaces of which the user is a member.

For instance, collaboration spaces are implemented in the following manner in one example embodiment. When a user requests a certain collaboration space, e.g. by selecting it, in order to view details, communications, and/or work associated with the collaboration space, the platform 100 can automatically present the requested collaboration space in conjunction with other related collaboration spaces that pertain to the same message and of which the requesting user is a member. Alternatively, the platform 100 can automatically present or display a subset of the information/data associated with the related collaboration spaces pertaining to the same message. For example, the platform 100 can present only the message/sub-message to which the user has access. Displays or presentation layouts according to such embodiments can provide users with convenient access to all information pertaining to a single message (which the user is permitted to access), thereby allowing users to easily synthesize information from multiple collaboration spaces and provide their contributions to the message.

Additionally or alternatively, the collaboration spaces can be workspaces corresponding to a defined directory and/or file structure/location. Such workspaces can be real or virtual, e.g. implemented by the appropriate databases and storage devices on a server or networked through a communications device, as would be appreciated by one of skill in the art and described further herein. Furthermore, one of skill in the art will recognize that these examples in no way limit the present invention to the particular implementations of collaboration spaces described herein. Rather, one of skill will appreciate other forms, database structures, and implementations that represent equivalents of the present invention.

With further reference to FIG. 2A, the collaboration module 110 can assign ownership and/or one or more permissions (step 116). In illustrative embodiments, messages are implemented as documents, free text, or other data to which an owner may be assigned. In such illustrative embodiments, ownership of a message is automatically assigned to the creating user, the initiator, such that the creating user is provided with a set of automatically generated permissions enabling access to the message. In alternative embodiments, ownership of a message can be assigned to an administrative user or to another user. Additionally or alternatively to assigning an ownership, the system 100 may assign one or more permissions to the creating user that enable the creating user with particular access rights, including the right to set permissions of other users.

In general, when setting the permissions of users that are invited to access a message (FIG. 2A) or a sub-message (FIG. 2B), the platform 100 can be configured to enable different access rights to be assigned to different members of an invited user group. For example, a user designated an "expert" may be assigned different access rights from a business partner, e.g. a supplier. For instance, the platform 100 can be configured to assign (either automatically or in response to a request by a creating user) different access rights to experts, enabling experts to view only a subset of a message or sub-message. This can be beneficial in situations where a message or sub-message contains confidential information that may be shared with a business partner but not with a third-party expert enlisted simply to offer scientific or other expert opinion. Furthermore, permissions can provide different or the same access rights to partners occupying different points along a supply or value chain. Thus, while some embodiments may provide one or more predetermined permissions to a partner based on the partner's point or position along a supply or value chain, such a system for assigning permissions is not required. Accordingly, the present invention is not limited to any particular system or mechanism for determining permissions, and is not limited as such to platforms featuring a mechanism for setting permissions.

Some embodiments according to present invention provide the creating user the ability to submit, e.g. as a part of the message request, the names, contact information, etc. of one or more users/partners to be invited using the platform 100 to access the message. In general, permissions of users invited to access the message may be assigned automatically, based on information contained in the message request, or based on some combination thereof. For example, the initiator of the message may be allowed to additionally select and submit one or more particular permissions for each partner that the initiator includes in the invitation list, thereby controlling access of the invited partners to the message.

In embodiments where the user is given the option to submit an invitation list comprising one or more partners to be invited to access the message, the creation of the collaboration space can additionally include sending an invitation to the one or more partners included in the invitation list (step 118). One of skill in the art will appreciate that depending on the embodiment and implementation, the steps depicted in FIG. 2A and subsequent Figures need not be executed in the specific order that is shown, unless otherwise noted. For example, it may be possible for the steps to be rearranged in a different order or for numerous steps to occur simultaneously.

As is illustrated by FIG. 2B, the client communications module 102 can also receive a request from the receiver of a message, i.e. a so called first degree partner invited to collaborate on a message, to create a sub-message and associated collaboration space (step 120). Upon receipt of the sub-message request, the collaboration module 110 can then generate a new collaboration space and create the sub-message in the new collaboration space from information contained in the sub-message request (step 122). With further reference to FIG. 2B, the collaboration module 110 can assign ownership and/or one or more permissions to the sub-message (step 124). In embodiments where the first degree partner that requests creation of a sub-message is given the option to submit an invitation list comprising one or more second degree partners to be invited to access the sub-message, the creation of the new collaboration space can additionally include sending an invitation to the one or more second degree partners included in the invitation list (step 126). The steps depicted in FIG. 2B will be described in more detail further below.

Figure 3:
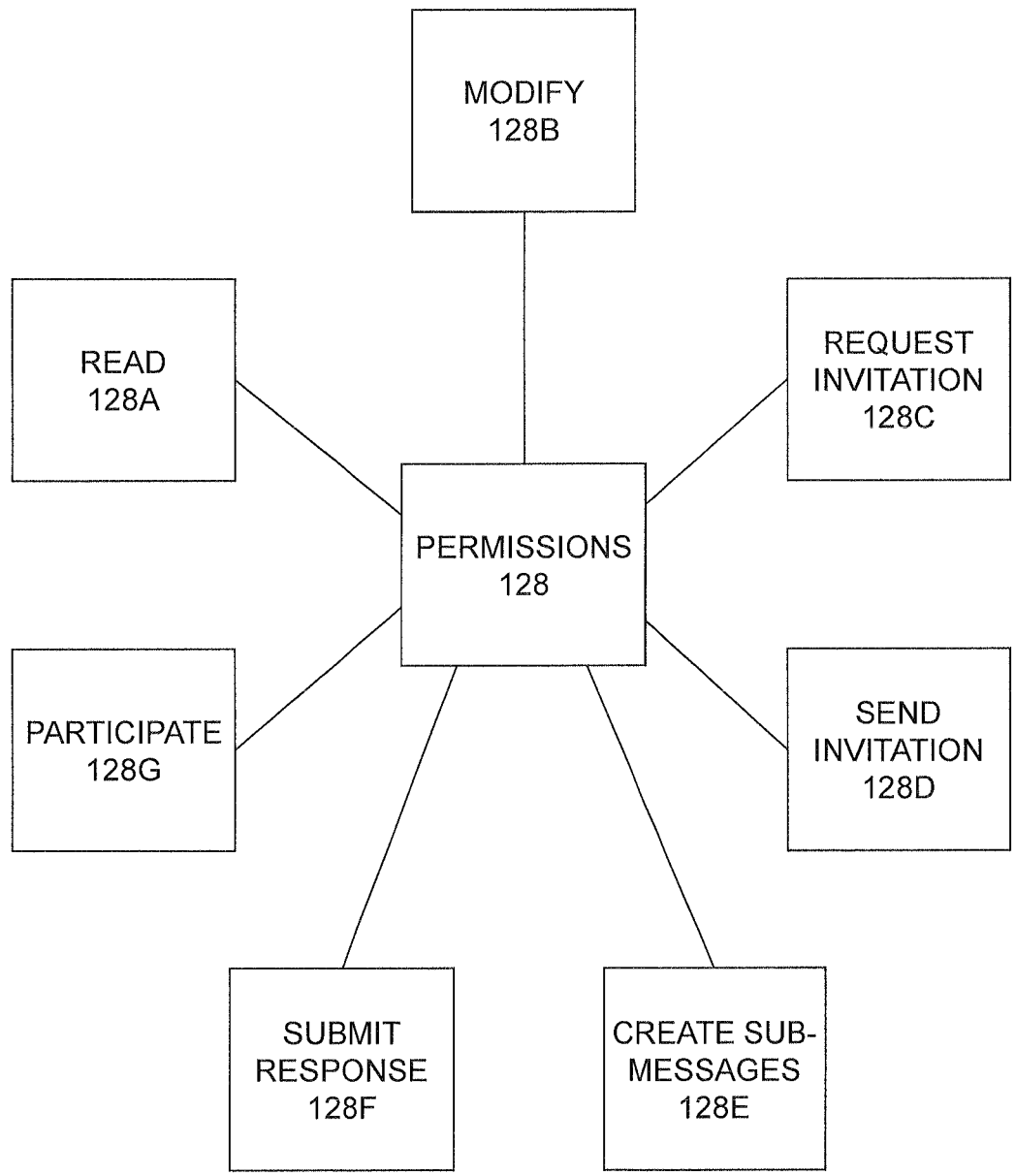
FIG. 3 is a diagrammatic illustration of various example permissions according to one aspect of the present invention.

FIG. 3 depicts further illustrative examples of the permissions 128 assigned by the collaboration module 110. In particular, the permissions can include any one or more of the following: permission(s) to read the message 128a, permission(s) to modify the message 128b, permission(s) to request the creating user to send an invitation to access the message 128c, permission(s) to initiate the system 100 to send access invitation(s) 128d, permission(s) to create sub-messages 128e, permission(s) to submit a response to the message 128f, and permission(s) to participate in particular communication mechanisms enabled or supported by the collaboration space 128g. One of skill in the art can appreciate that many other permissions and access rights are possible and contemplated within the scope of the present invention.

Figure 4:
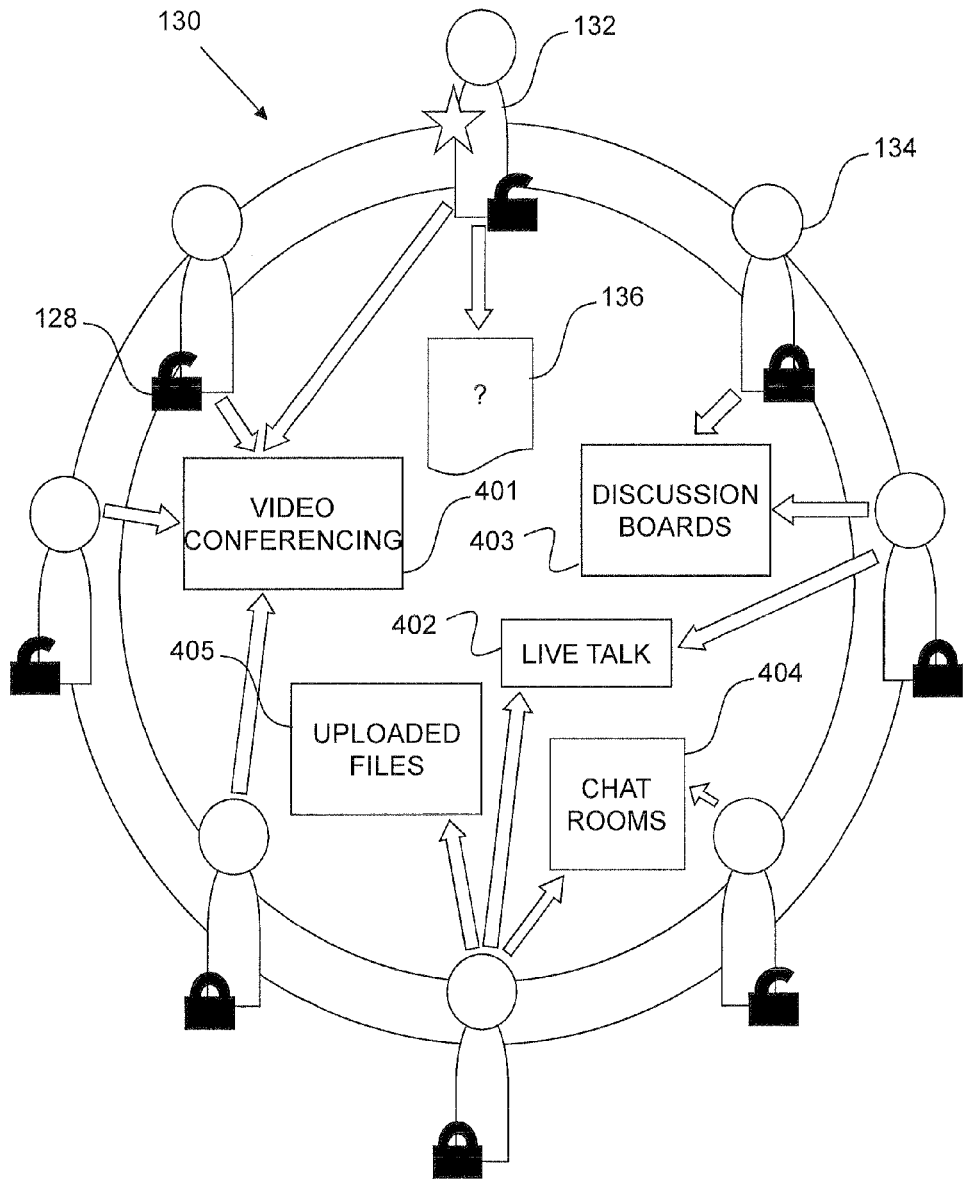
FIG. 4 is a diagrammatic illustration of a collaboration space and example features and interaction enabled thereby, according to aspects of the present invention.

Generally, the collaboration space can facilitate a wide variety of interactions between the creating user and the invited users. For instance, FIG. 4 schematically depicts several illustrative examples of such interactions. An example collaboration space 130, diagrammatically depicted as a circle, includes an example message 136 created by an example creating user 132, designated schematically by a star. In addition to the creating user 132, the message 136 is accessible by seven example invited users 134. The specific access rights of each user are determined by one or more specific permissions 128. While the permissions 128 are illustrated as a simple lock in FIG. 4, one of skill in the art can appreciate that each user can be assigned a set of one or more permissions, which can, for example, be specific to any number or plurality of different applications, software, functionality, etc.

Furthermore, via the collaboration space 130, the creating user 132 and/or the invited users 134 can be enabled to launch plug-ins, run software/applications, including potentially proprietary and/or licensed software, and access communication features or modules generally supported by, accessible through, and/or otherwise provided by the collaboration space and one or more GUIs generated by the GUI generator 108. For example, users can be allowed or enabled to utilize social media forms of communication, video conferencing

401, blogging, "live talk" features 402, discussion boards 403, chat rooms 404, instant messaging, file uploading 405, and many other features. One of skill in the art will appreciate that the specific examples of FIG. 4 are in no way limiting, but rather are provided for purposes of illustration.

Furthermore, any or all of the discussions boards, chats, chat histories, uploaded files, and any or all other communications enabled by the collaboration space 130 can be kept hidden and confidential from users without the requisite permissions to access the collaboration space 130 and/or the message 136. In general, user permissions can be set that enable or deny the ability to access, e.g. view, modify, create, etc., communications enabled by the collaboration space 130. As one example, permissions can be set in such a way so as to provide (1) the creating user 132 and all invited users 134 with full access rights to all or some of the communication features or modules in the collaboration space 130, and (2) one or more other users not invited to the collaboration space 130 with partial access rights, e.g., read-only, to all or some of the communication features or modules in the collaboration space 130. As an alternative example, permissions of invited users 134 to access all or some of the communication features or modules in the collaboration space 130 can be set by the creating user 132. For example, the creating user 132 can be provided with the capability to individually set each invited user 134's access rights to each of the communication features or modules in the collaboration space 130.

For instance, the creating user 132 may determine that a first invited user is permitted to participate in only discussion boards and chat rooms, that a second invited user is permitted to participate in only uploading files and video conferencing, that a third invited user is permitted to participate in all communication features and modules in the collaboration space 130, etc. In this manner, embodiments of the present invention can enable the communications of each of a plurality of collaboration spaces, such as the example collaboration space 130, to be fully or partially confidential, e.g. as desired by the creating user of each collaboration space. Another example could be that the initiator can prevent a participant to access a document as long as the participant does not accept a non-disclosure agreement (NDA). Access to a document could also be restricted by the platform as long as the participant does not accept an NDA that is required by the owner of the document. In such case, the owner may not necessarily be part of the current workspace. The document for instance could have been copied from a related message if the workspace deals with a sub-message.

Additionally, once a collaboration space is created, the creating user may send additional access invitations as desired. For example, if the creating user is a distributor, he or she may decide to initially send access invitations to two business partners who are suppliers. Upon holding two video conferences and exchanging several messages, the three users accessing the collaboration space may determine that expert opinion regarding the message is required in order to make additional progress toward a solution or response. In such instances, the creating user, i.e. the distributor in the example, may invite an expert as a fourth user to access the collaboration space. In a similar manner, requests for the system 100 to send invitations to access the collaboration space can also be initiated by a user provided with permission to send access invitations.

Figure 5:
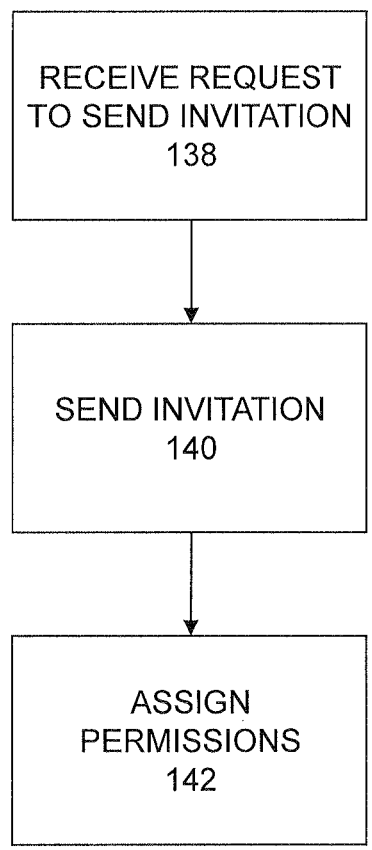
FIG. 5 is a flow chart depicting an exemplary method for inviting additional users to access a message or sub-message, according to aspects of the present invention.

FIG. 5 depicts an exemplary embodiment of the system 100's response to receiving an access request from a user. At step 138, the communications module 102 can receive a request from a user to send an access invitation to one or more additional users, such as an expert. In some embodiments, the user may be further allowed to submit one or more permissions for the collaboration module 110 to assign to the user being invited to access the collaboration space. For example, the access invitation request can include one or more selectable, fillable, etc. fields for enabling the inviting user to select one or more permissions for the user recipients of the invitation. Alternatively or additionally, the permissions can be automatically assigned by the system 100, based on a predetermined set of permissions. For example, in some embodiments, the system 100 is configured to automatically assign all users designated as experts a predetermined set of one or more permissions.

At step 140, the collaboration module 110 can send an access invitation to the one or more invited users or partners included in the access invitation request. More specifically, the collaboration module 110 can communicate with one or more electronic mail (e-mail) servers, e-mail services, instant messaging services, communication web pages, or the like, in order to electronically send an invitation one or more additional users to access the collaboration space. The additional users that are invited to access the collaboration space can be users with a pre-existing user account through which the functions of the system 100 described herein are generally accessible. In some embodiments, users with a pre-existing user account are enabled to view invitations at a web page hosted by the system 100. Alternatively, the invited partners can be users without such a pre-existing user account. For example, users without pre-existing user accounts can be enabled to access the collaboration space. For example, an e-mail or other message can be sent to such users without a pre-existing user account that enables the user to create such an account and thereby access the collaboration space. As an additional non-limiting example, users without pre-existing user accounts can be sent an e-mail or other message that contains a link to a web page providing access to the collaboration space. Upon navigating to the web page of the link, such a user can be automatically assigned a user identification or user name with which the user will interact with the collaboration space.

In some embodiments implemented with user accounts, users additionally can be allowed to invite new users to create a user account, e.g. by providing contact information such as an email address. The system 100 can receive such contact information submissions, determine whether the received contact information has been registered with the system 100 under an existing user account, and subsequently send an invitation using the contact information inviting the user associated with the contact information to register a new user account if not already registered. Alternatively, if the system 100 determines that the received contact information is already associated with an existing account, then the system 100 can provide the existing account information to the user that initially submitted the invitation to the system 100.

Continuing with the method of FIG. 5, the collaboration module 110 can assign one or more permissions (step 142) controlling the access of the user(s)/partner(s) to whom an access invitation was sent. In further embodiments, the one or more permissions being assigned can be selected as described previously herein, e.g. by the system 100, by the user sending the invitation, by the creating user of the collaboration space, or by some combination thereof. The step 142 of assigning one or more permissions can be executed prior to sending the access invitation, simultaneous with sending the access invitation, or subsequent to sending the access invitation, as would be appreciated by one of skill in the art.

In illustrative embodiments of the present invention, the identity of the initiator and the identity of each invited first degree partner is automatically visible to other invited first degree partners within a given collaboration space. In alternative embodiments, some or all of the identities of partners accessing a single collaboration space or inquiry can remain hidden or concealed. For example, in some embodiments, each partner that is invited to join the collaboration space, i.e. access the inquiry, is enabled to select whether to permit or deny other invited users existing within or subsequently invited into the collaboration space to view his/her identity.

Once an initial collaboration space is created for enabling an initial group of invited first degree partners to address a message, also referred to as an initial invited user group, the system 100 enables the creation of one or more additional or subsequent collaboration spaces to be formed by members of the initial user group. In particular, each invited first degree partner may be assigned one or more permissions enabling or denying him/her the ability to create a sub-message. And in a similar manner, each member of an invited user group with access to a sub-message may be assigned one or more permissions enabling or denying him/her the ability to create a further sub-message.

Returning now to FIG. 2B, an exemplary method is depicted for creating a sub-message, according to illustrative embodiments of the present invention. As described previously herein, members of an initial invited user group can be permitted either automatically, manually, or some combination thereof, to send a request to create a sub-message, which initiates the system 100 to create the sub-message. Accordingly, if such a request is submitted, then the request is received (step 120) by the client communications module 102. The client communications module 102 initiates the collaboration module 110 create a sub-message (step 122) of the inquiry and a new collaboration space through which the sub-message will be accessible, ownership and permissions to access the sub-message are set (step 124) and an invitation to access the sub-message is sent to second degree partners (step 126).

In illustrative embodiments, access to any newly created or subsequent sub-message is only initially provided to the creating user of the sub-message and any invited users initially provided by the creating user of the sub-message, e.g., in the request to create a sub-message or in a subsequent access invitation request from the creating user of the sub-message. In some embodiments, the subsequent creating user, i.e. the initiator of the sub-message, is enabled to choose whether the initial creating user, i.e. the initiator of the parent message, is to be permitted access to the subsequent collaboration space or sub-message, e.g. by selecting a selectable field on a GUI created by the GUI generator 108 and presented to the user at the user device 106. Additionally or alternatively, a subsequent creating user can be enabled to choose whether or not to conceal the existence of the sub-message and/or the identities of any members of the subsequent invited user group, i.e. second degree partners, to the initial creating user or to members of the initial invited user group, i.e. first degree partners.

In general, the functions, permissions, interactions, etc. described with reference to the initial collaboration space for accessing the original message similarly can apply to subsequent collaboration spaces for accessing sub-messages. However, it is not a requirement of the system 100 for such functions, permissions, interactions, and other features to be identical for all collaboration spaces, or even any two collaboration spaces. As one example, permissions to sub-messages need not be assigned in the same manner that permissions are assigned to the parent message. For instance, in some embodiments, the initiator of the parent message may be provided with the ability to assign permissions that specifically allow or deny each first degree partner of the initial invited user group, i.e. each user with access to the parent message, the ability to set permissions of second degree partners, i.e. members of subsequent invited user groups. For example, the initiator of a message can be permitted to select which first degree partners in the initial invited user group are allowed to create sub-messages; the initiator of the parent message may further be permitted to select which first degree partners in the initial invited user group are allowed to set the permissions of subsequent users invited to access such created sub-messages. Very likely, default participant rights that cover 90% of the cases will be set. These default rights may be linked to default participant types or can be linked to types of collaboration spaces. Typical examples of collaboration spaces with appropriate rights that fit a certain type of subject or context will be saved as templates and will be accessible in a library or through a wizard.

Continuing with FIG. 2B, at step 124, the collaboration module 110 can assign ownership and/or permission(s) to the creating user of the sub-message and to any users provided to the system 100 in an access invitation request from the creating user of the sub-message. Next, at step 126, one or more access invitations can be sent to one or more users if any access invitation requests were included in or with the request to create a sub-message. Once the subsequent collaboration space is created to provide access to the sub-message, the new collaboration space can enable any of the communication features and capabilities described previously herein, such as the communication features described with reference to FIG. 4. Similarly, invited second degree partners with access to a sub-message can be assigned one or more permissions enabling or denying them to create further sub-messages. For example, by executing steps 120 through 126, a user invited to access a sub-message of a message can create a sub-message of the sub-message.

Figure 6:
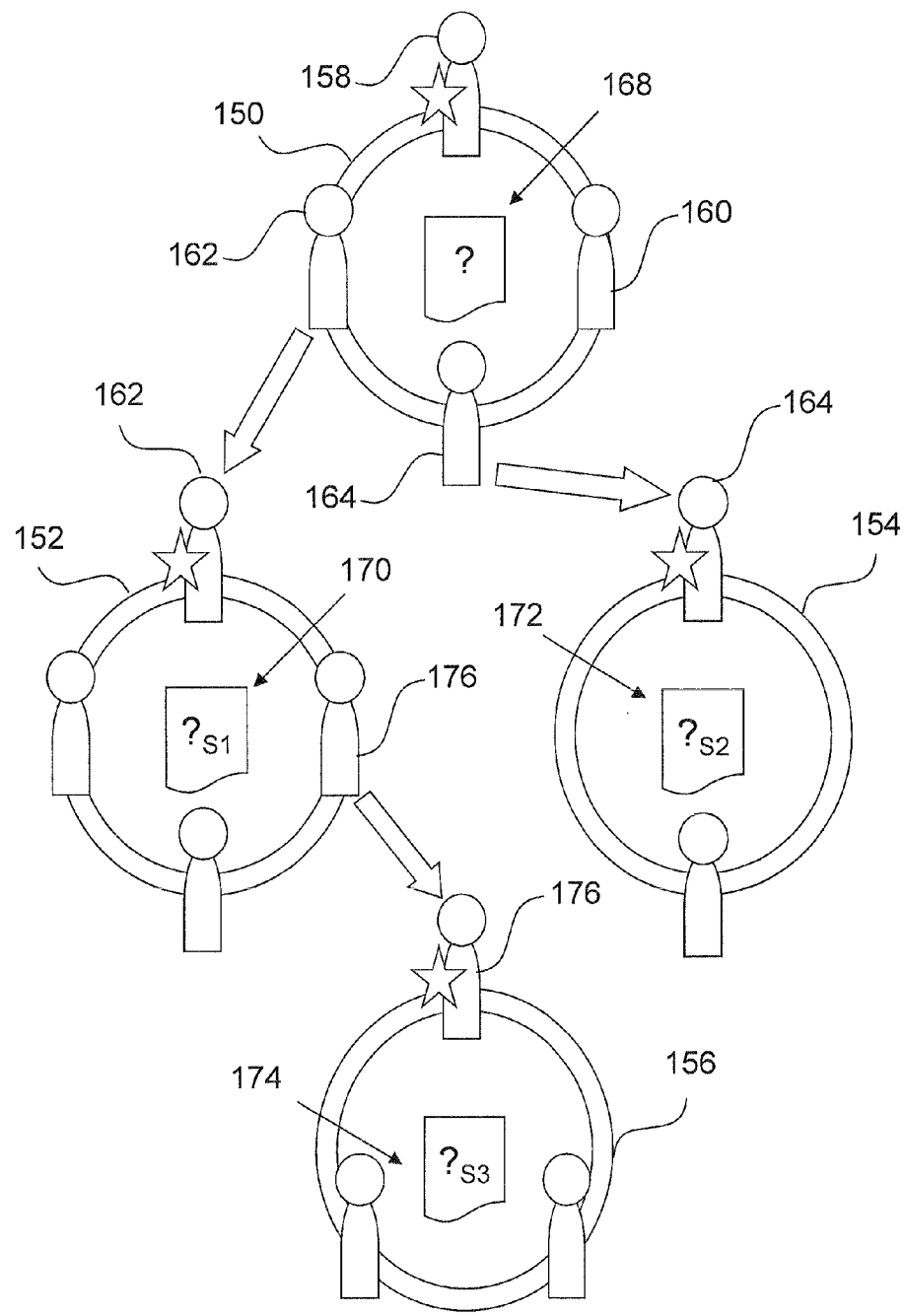
FIG. 6 is a diagrammatic illustration of a message and three sub-messages, each of which is accessible to a respective initiator and members/partners of an invited user group, according to aspects of the present invention.

In this manner, illustrative systems and methods according the present invention provide the capability to generate successive sub-messages or versions of a message, as depicted schematically in FIG. 6. Specifically, FIG. 6 illustrates four example collaboration spaces 150, 152, 154, and 156. Initiating partners are distinguished from invited partners by a star. Collaboration spaces are depicted diagrammatically by a ring. For example, collaboration space 150 provides an initiator 158 and three invited first degree partners 160, 162, and 164 with access to an initial message 168. Through the system 100, invited first degree partner 162 created a sub-message S1 or 170 of the message 168, which is accessible through the collaboration space 152. In a similar manner, invited first degree partner 164 created a sub-message S2 or 172 of the message accessible through collaboration space 154, and invited second degree partner 176 created a further sub-message S3 or 174 of the sub-message 170 accessible through collaboration space 156. Accordingly, a single user can be both an invited partner in one collaboration space and an initiator of a different collaboration space, as depicted by FIG. 6. It is noticed that in the example of FIG. 6 as well as in FIG. 8A and FIG. 8B, the initiator of the subsequent messages is each time a member of the collaboration space of the parent message. This is only one possibility though. As will be illustrated by FIG. 11 and FIG. 12, described further below, the messages can also be sent to contributors such that a new contributor becomes initiator of a new collaboration space, without being a member of the collaboration space of the parent message.

Additionally, in some embodiments, creating users of a sub-message can be enabled to use the collaboration space to provide a response to the parent message or sub-message from which it was created. For example, the collaboration space of a sub-message can provide each creating user with a feature for responding, e.g. a "Respond Now" button on a GUI, which, when activated, prompts the creating user to attach a file or generate a response, e.g. as free text, etc., for the system 100 to send. As illustrative examples, a response can comprise any one or more of the following: an answer, a confirmation, additional input, a follow-up question, a question requesting clarification, a reply, a comment, a selection of one or more options or selectable fields/buttons provided in the sub-message, and/or any other type of response.

The feature of sending a response can be enabled by creating an association, e.g. a link, between the sub-message and the parent message from which the sub-message was created. Thus, step 122 depicted in FIG. 2 can include the additional step of the system 100 automatically creating an association between the sub-message and its parent, e.g. either the message itself or some preceding sub-message) and causing the association to be stored in a database. As alternatives, however, associations between collaboration spaces can be manually established by a system administrator or a user provided the user has the appropriate rights on both the messages he wishes to link. The user may for instance be member of the collaboration space and initiator/owner of the message he wishes to link to the first message. An example could be a question where a plastic doll contains certain harmful substances. While the issue is being treated with several sub-messages in the supply chain, a new question may come in with almost the same content. The product manager of the doll can then assign the question to the workspace that is already dealing with the question. As illustrative examples, the association or link that is optionally created in step 122 can include any one or more of the following: an association between the sub-message and its parent, an association between the initiator of the sub-message and the initiator of its parent, or an association between the collaboration space of the sub-message and the collaboration space of its parent.

For example, in illustrative embodiments, the association or link can be implemented with a table data structure. For instance, the system 100 can create a new table of relations for each message that is created. For any given message, the corresponding table of relations tracks the associations between the message and its sub-messages. Thus, each time a partner creates a sub-message of an existing message, a new entry or value is added to the table corresponding to the existing message, and the new entry or value represents the new sub-message that has been created. Additionally, each time a user creates a new message, the system 100 creates and stores a new table of relations for tracking the appropriate associations. As would be appreciated by one of skill in the art, the tables of relations can be stored in a local database, a remote database, a cloud database, or a combination thereof. As an alternative to the just described tables memorizing links between messages and sub-messages, the link between users or collaboration spaces may be memorized.

Each of the tables of relations further can be configured to track the partners (and their permissions) that are associated with and have access to the corresponding message and its related sub-messages. Accordingly, the tables of relations can be utilized to perform functions associated with building or presenting collaboration spaces, including, as examples: (1) presenting related messages to a particular user having access to the related messages; (2) sending an answer or response from a sub-message to its parent sub-message or message; and (3) sending certain types of automated messages, i.e., messages that do not require manual intervention by users, such as due date reminders, inquiry updates, update requests, etc. For example, the system 100 can be configured to utilize one of tables of relations in order to send a reminder received from an original creating user to all sub-messages related thereto.

Using such associations, e.g. links and entries in the tables of relations, the system 100 enables responses to be quickly and efficiently transmitted to an initiator of a message from an invited partner of a sub-message who is anonymous to the initiator of the message. Similarly, the invited partner of the sub-message further may be unaware of the identity of the initiator of the message, thus avoiding negative impacts on the business of members of the supply or value chain members occupying intermediate points between that of the invited partner of the sub-message and that of the initiator of the message. Furthermore, such associations can enable the members of invited user groups along a supply or value chain of preceding sub-messages to remain anonymous (if so desired) while maintaining a system enabling the various invited user groups to work toward a solution on a common problem.

Figure 7:
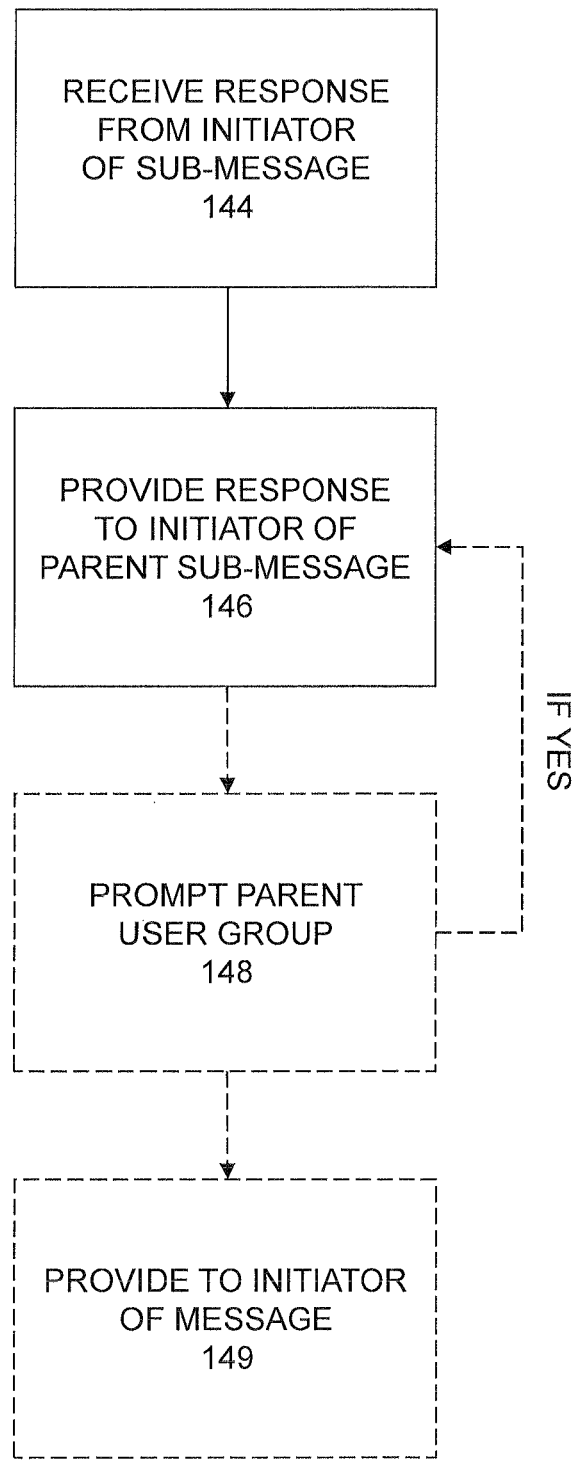
FIG. 7 is a flow chart depicting an exemplary method for providing and transmitting responses among users, according to aspects of the present invention.

FIG. 7 describes an exemplary method by which the platform 100 reacts to the submission of a response. The communications module 102 receives the response from the initiator of a sub-message (step 144). The collaboration module 110 can then, in one possible implementation, utilize the link or other association created in step 122 to provide the response to the initiator of the parent of the sub-message (step 146). In another possible implementation, the communications module 102 would prompt the initiator of the sub-message in step 144 that the received response may be useful to provide a response to the parent message, and suggest different alternatives: copy the response into a response to the parent message, copy and amend, or simply create or edit the response to the parent message while viewing the response to the sub-message in a separate window side-by-side. Additionally or alternatively, the response can be provided to any invited partners with access to the parent of the sub-message. One of skill in the art will appreciate that the step 146 of providing the response to the initiator of the parent of the sub-message can include any one or more of the following: providing the response, providing a copy of the response, providing a link to the response, or the like. The response can be provided via e-mail, via the collaboration space of the initiator of the parent, via a messaging service, or via any other suitable communication feature. Once the response is accepted by the initiator of the parent message as final response, the status of the message will be changed to "answered", so the platform stops prompting for updates and/or sending due date reminders. The status change dates will be stored so they can be used for status reports and statistics later on.

In a first illustrative example, the collaboration space is implemented as one or more personalized web pages. Accordingly, step 146 can comprise including or adding the response to one or more of the web page(s) personalized specifically for the initiator of the parent sub-message. For example, in such embodiments, the personalized web page(s) of any initiator of a parent sub-message can be automatically modified by the system 100 as a result of the communications module 102 receiving a response from an initiator of a sub-message of the parent sub-message. In this manner, the web pages of initiators of parent sub-messages can be automatically updated or modified to provide access to a response submitted by the initiator of a sub-message of the parent. In a second illustrative example, the platform 100 can automatically email as an attachment any received response to the initiator of a parent sub-message.

Upon the system 100 receiving a response from an initiator of a sub-message (step 144), and in addition to providing the response to the initiator of the sub-message's parent (step 146), the system 100 optionally can prompt the parent user, message, or group (or a combination thereof), e.g., with an opportunity to further send along the received response (step 148). For example, upon receiving the response (step 146), the platform 100 can automatically provide the initiator of the sub-message's parent with a graphical user interface that allows the initiator to initiate the platform 100 to further pass along the response unmodified or modified or incorporated into a newly created or edited response. In particular, if the parent is itself a sub-message, then it too has a parent. In such scenarios, the system 100 can automatically provide the initiator of the sub-message's parent with the option to send the response to its parent. This is depicted schematically by the example of FIG. 8A.

Figure 8A:
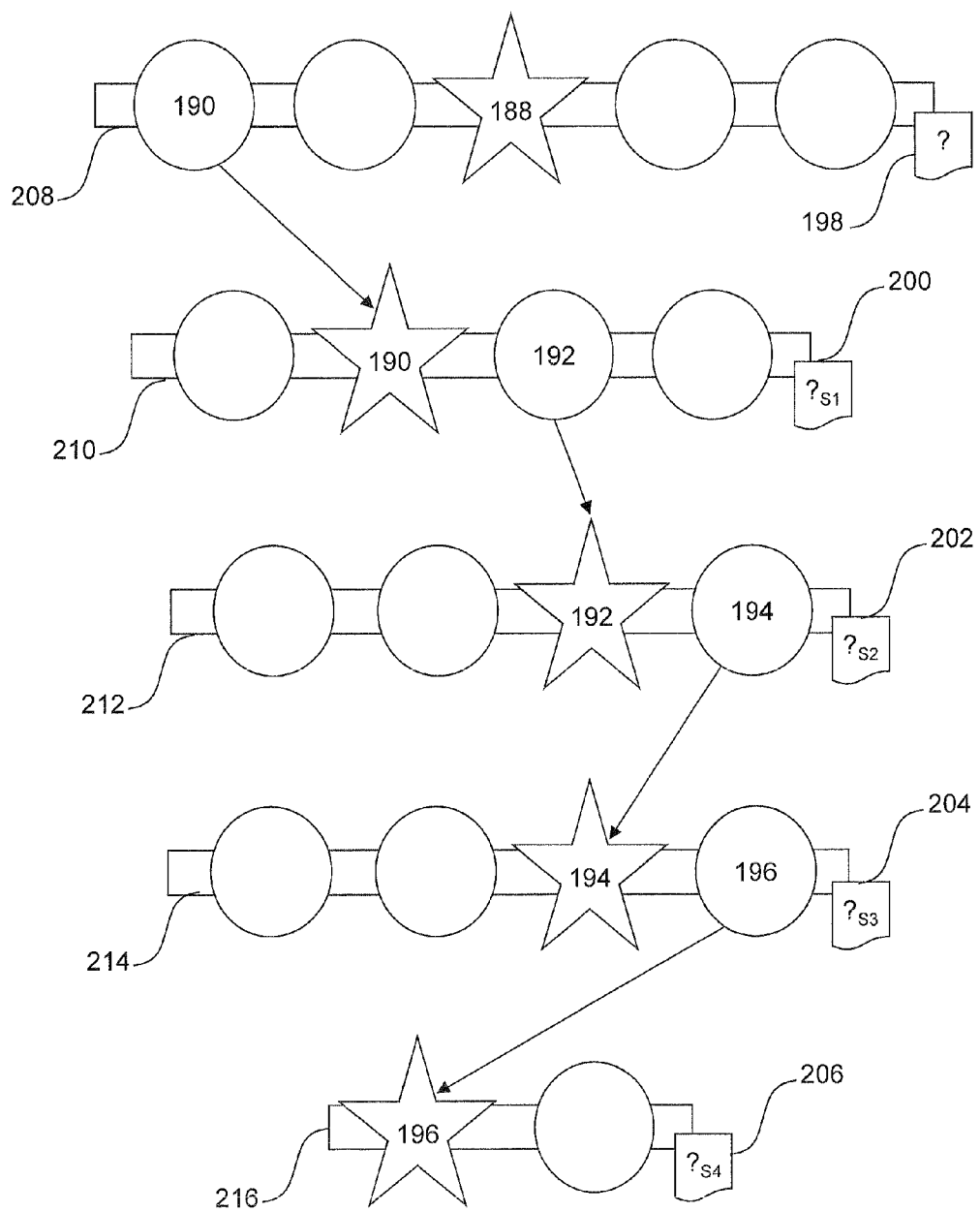
FIG. 8A is a diagrammatic illustration of a message and five sub-messages thereof, each of which is accessible to a respective initiator and members of an invited user group, according to aspects of the present invention.

FIG. 8A shows five collaboration spaces 208, 210, 212, 214, and 216, represented by straight bars. Five respective initiators 188, 190, 192, 194, and 196 are depicted by a star, and any invited partner is represented by a circle. In the example, a message 198 was created by an initiator 188, and successive sub-messages 200 or S1, 202 or S2, 204 or S3, 206 or S4 of the message were created by the initiators 190, 192, 194, and 196, respectively. Accordingly, if user 196 submits a response, e.g. on behalf of the users of collaboration space 216, then the response is provided in step 146 of FIG. 7 to user 194. Additionally, in step 148, user 194 can be provided the option to send the response to user 192, i.e. the initiator of the parent of the sub-message 204 created by user 194. If user 194 selects for the platform 100 to provide the response to user 192, e.g. after reviewing the response and determining that it is adequate, then the platform 100 repeats step 146 and optionally step 148 of providing the response to user 192 and prompting user 192 with an option to provide the response to user 190. Accordingly, in this manner, steps 146 and 148 can be repeated until the response is passed along from user 196 all the way up to user 188, the initiator of the inquiry itself. The process of repeating steps 146 and 148 thus ends at step 149 of FIG. 7, at which the response is provided to the initiator 188 of the message 198.

Figure 8B:
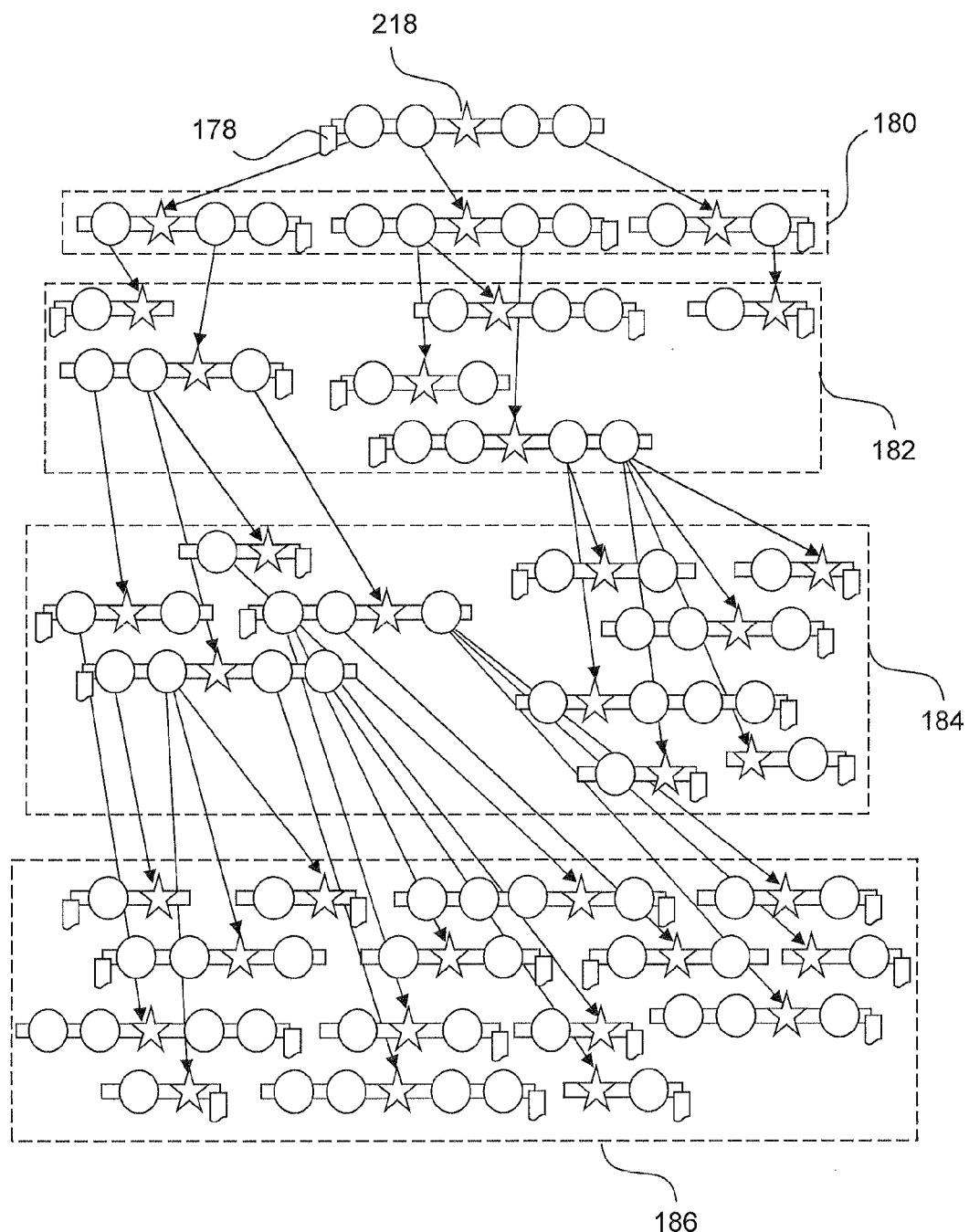
FIG. 8B is a diagrammatic illustration of a plurality of messages and sub-messages derived thereof, each of which is accessible to a respective initiator and members of an invited user group, according to aspects of the present invention.

FIG. 8B demonstrates some benefits of such a system when implemented for a highly complex network of users, particularly where there may exist a desire among users to maintain anonymity. Specifically, FIG. 8B depicts a plurality of sub-messages all originating back to an initial message 178 created by a user 218. Each sub-message can be categorized based on its degree of separation from the initial message 178. Accordingly, all messages enclosed by dashed box 180 are first degree sub-messages. Similarly, dashed box 182 encloses second degree partners, dashed box 184 encloses third degree partners, and dashed box 186 encloses fourth degree partners. As an illustrative example, each dashed box represents a different point in a supply or value chain. Accordingly, using the methods described herein, such a system can quickly and efficiently transmit information pertaining to a message through multiple points of a complicated and crowded supply or value chain, all while enabling the identity of each member of any invited user group to be concealed or visible from each member of each different invited user group.

In general, any sub-message can be a modified copy or an unmodified copy of the parent message or sub-message from which it is created. Furthermore, each sub-message can contain all or a subset of the immediately preceding data copy, i.e., the parent message or sub-message. For example, in some instances an initiator may create a message such that it comprises a list of related messages. In such instances, subsequent copies of the message may include modified or unmodified subsets of the initial list. As one illustrative example, each sub-message can be implemented as a data copy of the parent message/sub-message from which it was created. Accordingly, the message and related sub-messages together can form one or more data chains each comprising a plurality of successive data copies being joined by links or other associations.

As would be appreciated by one of skill in the art, data comprising the messages, user permissions, communication histories between users like e.g. messages, chat histories, etc., user accounts and information, and other features of the collaboration spaces can be stored in one or more databases. Generally, the databases can be real or virtual, and as such can be stored on one or more servers, in the cloud, e.g. using unique cloud identifications for retrieving data to create the collaboration spaces, on the individual user devices 106, and combinations thereof. One of skill in the art will appreciate that the particular manner in which information is stored and collected can vary depending on the particular choice of implementation for the collaboration spaces, etc.

For example, in illustrative embodiments according to the present invention, the collaboration spaces are implemented through user clients, e.g. web browsers on a computing device, UI applications or apps on a smart phone device, and any other clients/devices that present user-personalized displays of information to each user. For instance, the user-personalized displays of information can present users with lists of messages to which they have access, wherein the list comprises a plurality of links to additional displays each of which presents the user with information pertaining to that particular message/sub-message, e.g. the message/sub-message, discussion boards, comment chains, chat histories, or the like. Accordingly, in such embodiments, the message/sub-messages, discussions boards, comment chains, chat histories, etc. all can be stored in one or more central databases. Furthermore, for embodiments implemented specifically for one or more social media forms of communication, it may be desirable for the platform 100 to additionally be implemented by one or more other databases that are separate from the one or more central databases. For example, the one or more additional databases can be specifically configured to store data relating to the social media communication or other features with a potential for high traffic loads.

As yet an additional example of storing data for illustrative embodiments, data that is stored in one or more databases experiencing increased traffic can be duplicated to a new host location with load balance technology. In this manner, a duplicate database can be created for assisting with the high-load without disrupting the work flow of the platform 100. For example, in embodiments wherein such databases are stored in the cloud, information in a duplicate database or an original database can be easily stored, managed, and retrieved by utilizing unique cloud identifications (IDs) for storing the data in the particular desired structured manner, e.g. assigning each user a unique cloud ID, etc.

Figure 9A:
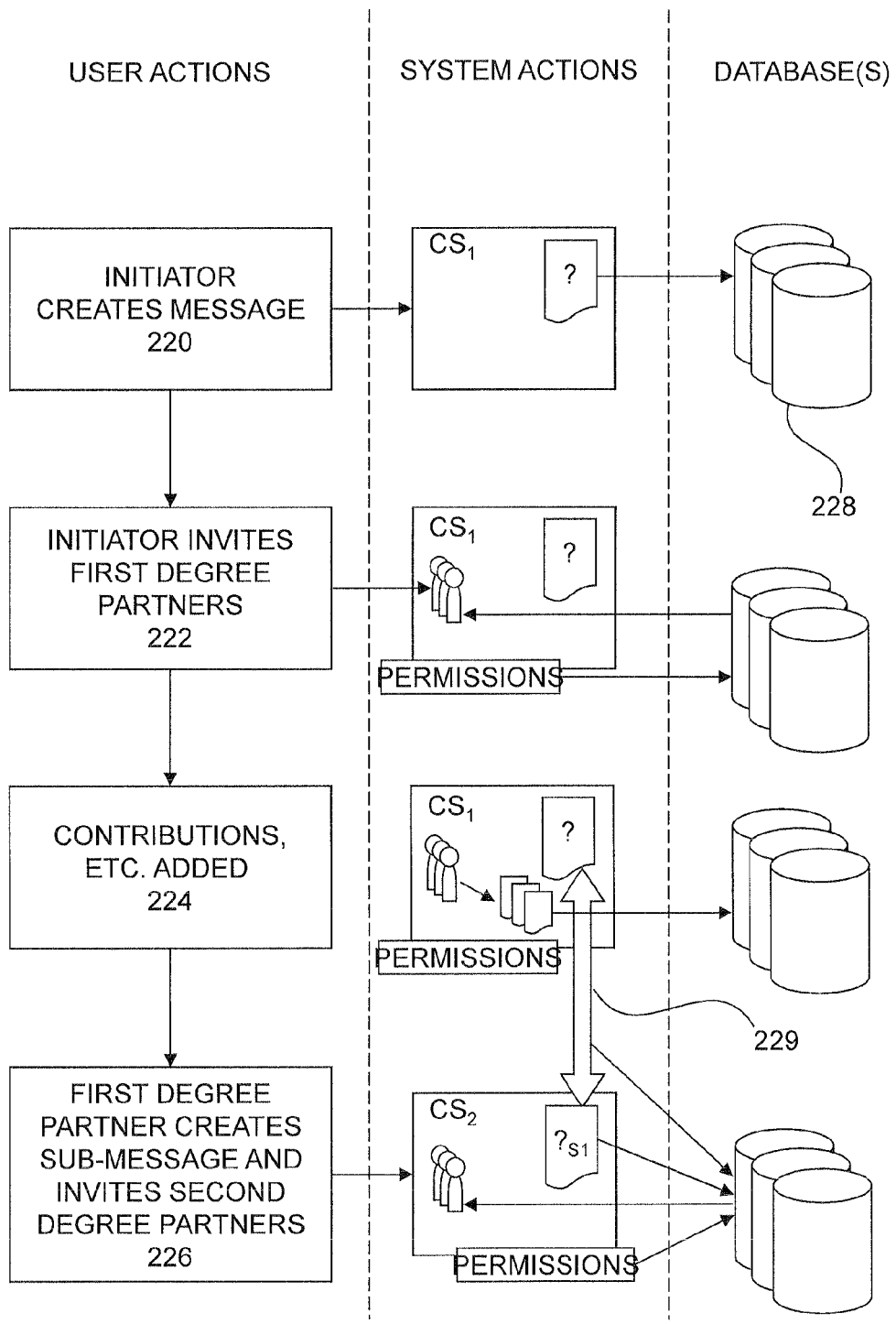
FIG. 9A is a diagrammatic illustration of exemplary interaction between users, the platform, and databases, according to embodiments of the present invention.

Accordingly, the platform 100 can be in communication with one or more databases. For example, the collaboration module 110 can be configured to initiate storage actions for storing information received from the client communications module 102 in one or more databases, such as the databases described previously herein. FIG. 9A depicts one example of the manner in which the platform 100 can store information in database(s) 228. An initiator creates a message (step 220), which can initiate the platform 100 to create one or more collaboration spaces CS1 that can be saved in the database(s)

228 and additionally can cause the system 100 to store the message in the database(s) 228. In some embodiments, and depending on the particular implementation of the collaboration spaces, it may not be required for the platform 100 to build a collaboration space until a user specifically requests to access it. Accordingly, the collaboration spaces shown in FIG. 9A are depicted for illustration and are not required.

The initiator can invite additional users, i.e. first degree partners, to access the collaboration space CS1 (step 222). For instances or embodiments wherein the users being invited interact with the platform 100 through pre-existing user accounts that are provided by the platform 100, step 222 can include: (1) the first user sending an access invitation request to the platform 100, (2) the platform 100 providing an invitation to the invited first degree partners, e.g. by retrieving the user accounts/contact information of the invited users and sending an invitation, or alternatively by automatically modifying the collaboration spaces for the invited users to provide the invited users with an access invitation, and (3) one or more permissions controlling access to the message being assigned and stored in the database(s) 228.

Contributions and communications can be added to the collaboration space CS1 by first degree partners accessing the collaboration space CS1 and/or associated message (step 224). Posts, responses, etc. can be automatically stored by the platform 100 in the database(s) 228 once received by the system 100. An invited partner with access to the collaboration space CS1 can create a new sub-message of the message (step 226). In particular, this can comprise (1) the invited first degree partner sending a request to the platform 100 to create the sub-message and including one or more second degree partners to invite to access the sub-message, (2) the platform 100 creating a collaboration space CS2 and storing the sub-message in the database 228, (3) the platform 100 storing an association 229 in the database(s) 228, e.g. a link) between the message and the sub-message, (4) the platform 100 providing an invitation to the invited second degree partners, e.g. by retrieving the user accounts/contact information of the invited users and sending an invitation, or alternatively by automatically modifying the collaboration spaces for the invited users to provide the invited users with an access invitation, and (5) one or more permissions controlling access to the sub-message being assigned and stored in the database(s) 228.

Figure 9B:
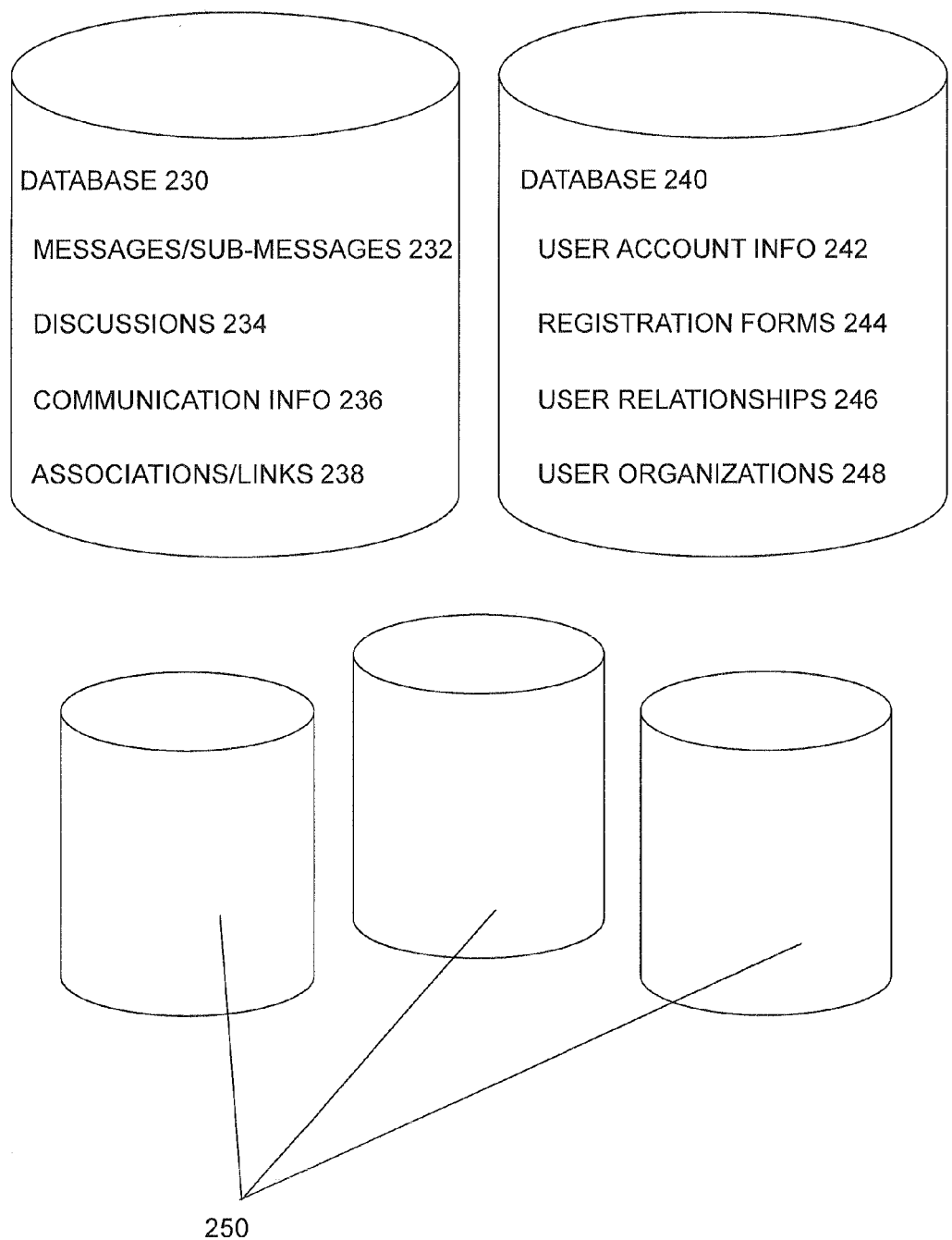
FIG. 9B is a diagrammatic illustration of an example database structure for storing data according to one aspect of the present invention.

In such embodiments as depicted in FIG. 9A, the database(s) 228 can be implemented by multiple databases, as would be appreciated by one of skill in the art. For example, FIG. 9B depicts one exemplary database structure for storing information associated with the messages/sub-messages, and collaboration spaces. A first database 230 can be configured to store information such as messages/sub-messages 232, discussions 234, other information pertaining to communication/interaction of users 236, associations or links 238 between sub-messages and messages, and other information. A second database 240 can be configured to store information such as user account information 242, registration forms 244 that enable user accounts to be created, user relationships 246 describing the manner in which users are associated, e.g. business partners, "User A is a supplier to User B", etc., user organizations 248 of which users may be members, and other information.

Additionally, the system 100 may include or communicate with one or more additional databases 250. For example, in embodiments implemented for supply or value chain collaboration, the additional databases 250 can include databases stored locally on a particular user's computing device and containing information related to the product or service developed and/or sold by the user, the user's business, e.g. business data, financial information, balance sheets, etc., or the user's organization. Additionally or alternatively, the databases 250 can include databases containing public knowledge, such as legislation information pertinent to a user's business, product requirements and norms as determined by governmental regulation agencies, standard practices and methodologies employed in the business, and/or other information.

One of skill in the art will appreciate a number of ways to store and manage the data and information described herein. All such embodiments and implementations are contemplated within the scope of the present invention. Accordingly, the illustrative implementation and database structures/configurations of FIGS. 9A and 9B are provided for clarity and explanation. In no way do these particular illustrative implementations limit embodiments of the present invention.

When implemented specifically for supply or value chain contexts and users that occupy particular points along a supply or value chain, additional features may be provided which utilize these relationships. For example, one or more user relationships, depicted as included in the second database 240 of FIG. 9B, can enable the platform 100 to provide users with one or more lists of known business partners. The lists can be categorized or classified in any number of ways, e.g. "My Suppliers", "My Experts", etc.). As an example of possible uses of such lists, a user's business partners can be displayed on a web page through which a message/sub-message is accessible, e.g. a web page implementing a collaboration space of which the user is an invited member. Furthermore, these lists or individual names of users on such lists can be selectable or associated with numerous commands. For example, in one embodiment, clicking a name causes a menu to appear on the display, with various command options. The command options can include, for example, a command to send an access invitation to the selected user(s), a command to request the initiator of the message/sub-message to send an access invitation to the selected user(s), a command to view/modify the permissions of the selected user(s), a command to terminate the selected user's access to the message/sub-message, or the like.

Figure 10A:
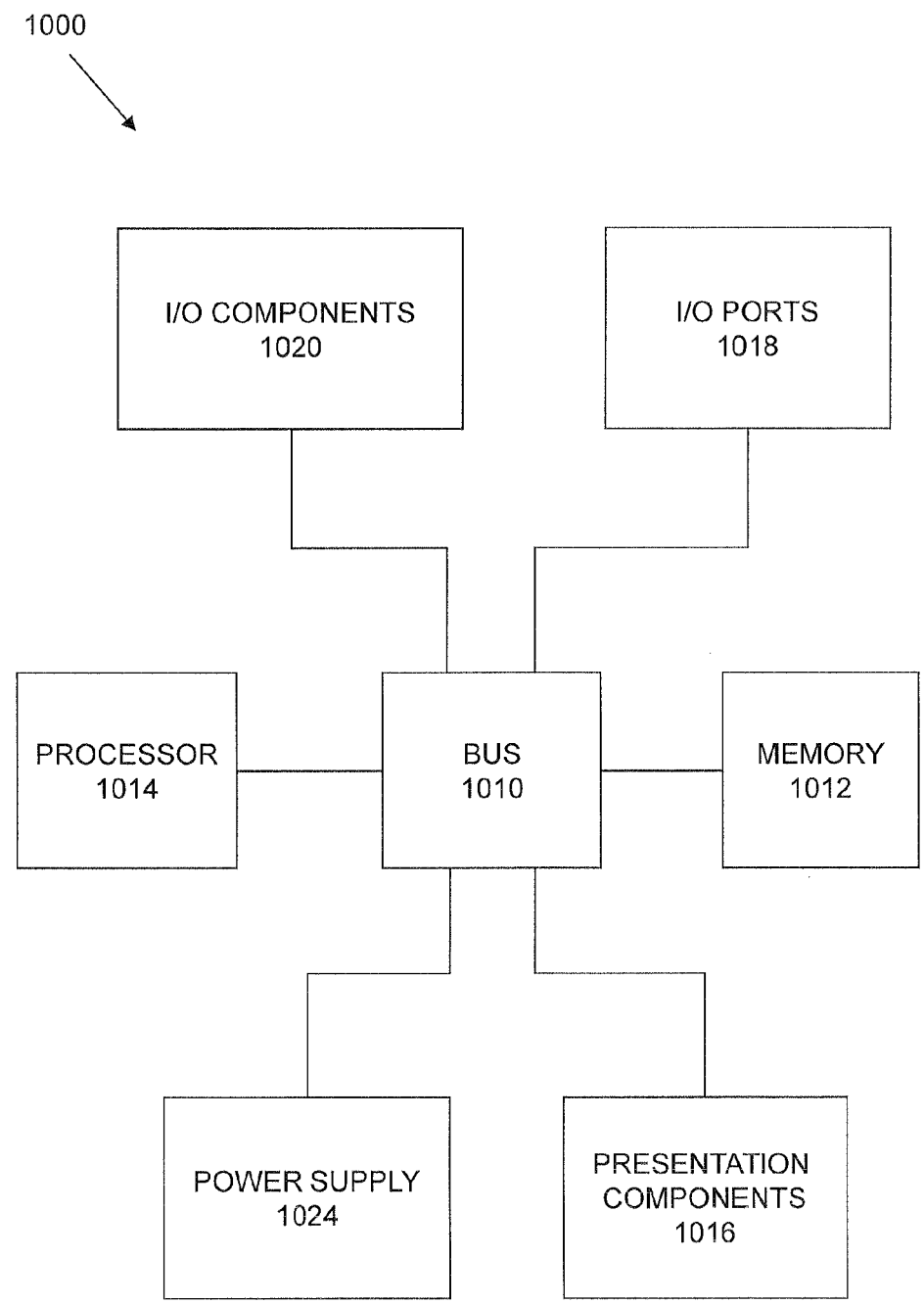
FIG. 10A is a diagrammatic illustration of an example computing environment for implementing the platform of FIG. 1, according to one or more embodiments of the present invention.

FIG. 10A illustrates an example computing device 1000 within an illustrative operating environment for implementing embodiments of the method and platform of the present invention. The computing device 1000 is merely an illustrative example of a suitable computing environment and in no way limits the scope of the present invention. A "computing device" as represented by FIG. 10A can include a workstation, a server, a laptop, a desktop, a hand-held device, a mobile device, a tablet computer, or other computing devices, as would be understood by those of skill in the art. Given that the computing device 1000 is depicted for illustrative purposes, embodiments of the present invention may utilize any number of computing devices 1000 in any number of different ways in order to implement a single embodiment of the present invention. Accordingly, embodiments of the present invention are not limited to a single computing device 1000, as would be appreciated by one with skill in the art, nor are they limited to a single type of implementation or configuration of the example computing device 1000.

The computing device 1000 can include a bus 1010 that can be coupled to one or more of the following illustrative components, directly or indirectly: a memory 1012, one or more processors 1014, one or more presentation components 1016, input/output ports 1018, input/output components 1020, and a power supply 1024. One of skill in the art will appreciate that the bus 1010 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 10A is merely illustrative of an exemplary computing device that can be used to implement one or more embodiments of the present invention, and in no way limits the invention.

The computing device 1000 can include or interact with a variety of computer-readable media. For example, computer-readable media can include Random Access Memory (RAM), Read Only Memory (ROM), Electronically Erasable Programmable Read Only Memory (EEPROM), flash memory or other memory technologies, CDROM, digital versatile disks (DVD) or other optical or holographic media, magnetic cassettes, magnetic tape, magnetic disk storage or other magnetic storage devices that can be used to encode information and can be accessed by the computing device 1000.

The memory 1012 can include computer-storage media in the form of volatile and/or nonvolatile memory. The memory 1012 may be removable, non-removable, or any combination thereof. Exemplary hardware devices are devices such as hard drives, solid-state memory, optical-disc drives, or the like. The computing device 1000 can include one or more processors that read data from components such as the memory 1012, the various I/O components 1016, etc. Presentation component(s) 1016 present data indications to a user or other device. Exemplary presentation components include a display device, speaker, printing component, vibrating component, etc.

The I/O ports 1018 can allow the computing device 1000 to be logically coupled to other devices, such as I/O components 1020. Some of the I/O components 1020 can be built into the computing device 1000. Examples of such I/O components 1020 include a microphone, joystick, recording device, game pad, satellite dish, scanner, printer, wireless device, networking device, or the like.

Accordingly, the collaboration platform and method provided herein enable numerous benefits. When implemented for supply or value chains, the systems and methods can enable collaboration of members operating at multiple points along a supply or value chain on a common inquiry. Through the platform and method described herein, a user can create a message and invite other users to access the message. The creating user or initiator can be allowed to control the invited users' access to the message through one or more permissions. The invited users can be permitted to create sub-messages of the message and inviting their own business partners, etc. to access the sub-message. This enables further collaboration on the message at an additional step down the supply or value chain. For example, returning to FIG. 8B, each dashed box 180, 182, 184, and 186 can generally represent different points of a supply or value chain.

Thus, by passing along a message, i.e. creating new sub-messages, users enlisted to collaborate with an initial creating user of the message are allowed to further collaborate with their own business partners, suppliers, etc., all in a safe manner that avoids undue exposure. Accordingly, members of an invited user group can be allowed to have open discussions with their business partners, etc. while concealing the identity of their business partners as well as the content of informal brainstorming exchanges from the initial creating user, if so desired. In this manner, a plurality of successive sub-messages can be created enabling the anonymous and confidential collaboration of members at various different points of a supply or value chain.

In accordance with the present invention, and from the perspective of a single user occupying a particular point of a supply or value chain, such a user is enabled to (1) create a message and quickly and efficiently receive responses that will aid in developing a solution to the message, (2) draw on the knowledge of many different members at multiple different points in the value chain, (3) allow partners invited to access the message to maintain the anonymity of their suppliers, business partners, etc. if so desired, thereby enabling greater efforts toward developing a solution without detrimental business exposure, and (4) invite experts to weigh in on messages and provide opinions or analysis of various aspects of a message.

Figure 10B:
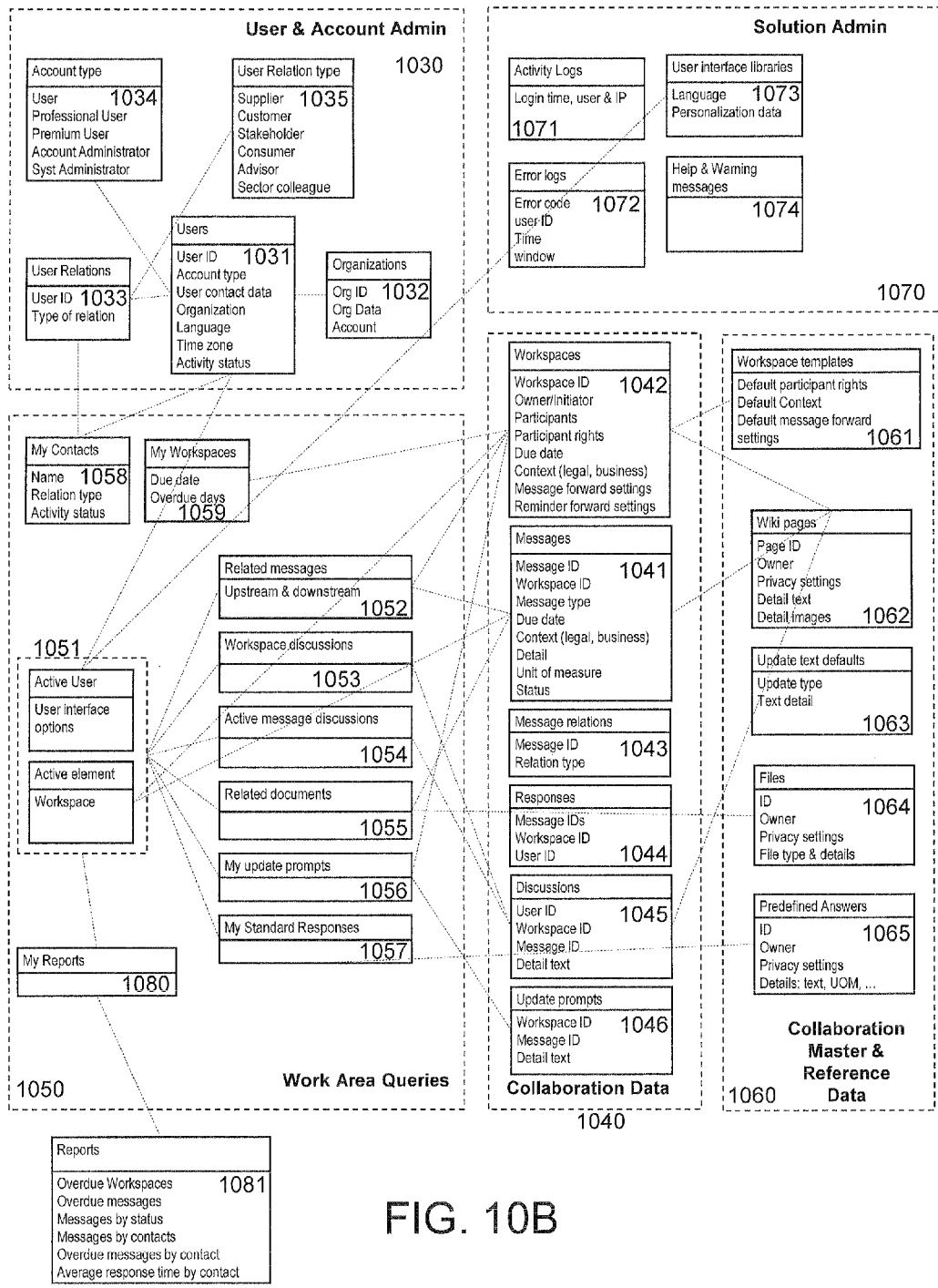
FIG. 10B is a diagrammatic illustration of an example data model for implementing the database 107 in the platform of FIG. 1, according to one or more embodiments of the present invention.

FIG. 10B shows an example data model that can be used for implementing the relational database 107 in FIG. 1. The data model shows a first block 1030 wherein user and account administration is maintained, a second block 1040 wherein collaboration data are kept, a third block 1050 for storage of work area queries, a fourth block 1060 wherein collaboration master and reference data are memorized, and a fifth block 1070 for solution administration.

The user and account administration block 1030 has a container 1031 for user related data like a user ID, the user's account type, the user's contact information, the organization where a user belongs to, the preferred language of the user, the time zone wherein the user resides, and his activity status (e.g. "online" or "offline"). For the organizations where users belong to, container 1032 stores the organization's ID, the organization's data (like address, predefined workspaces, user groups, etc.), and account particulars (e.g. the number of users that can use the organization's account). The user and account administration block 1030 further hosts a user relation container 1033 wherein the user ID and type of relation are maintained each time a user invites another user to participate. The different possible account types are stored in container 1034 and may for instance include "User", "Professional User", "Premium User", "Account Administrator", "System Administrator", etc. These account types are each associated with certain access rights to the platform and with payment conditions. The different possible user relation types are memorized in container 1035. In case of a supply value chain, this may for instance be "Supplier", "Customer", "Stakeholder", "Consumer", "Advisor", "Sector Colleague", etc.

The collaboration data block 1040 represents the platform's core since it maintains all data related to messages 1041, workspaces/lists of messages 1042, message relations 1043, responses 1044, discussions 1045 and update prompts 1046. In relation to messages, container 1041 for instance stores the message ID, workspace ID, message type (i.e. the type of response that is expected like for instance free text, Boolean, . . . ), the due date by which a response is expected, the legal and/or business context of the message, the details (e.g. the enquiry), the unit of measure to be used for the response, and its status. Similarly, once a workspace is created and next level participants are invited, container 1042 shall maintain in a record the workspace ID, the initiator of the workspace, the participants that are invited to the workspace and their respective rights, the due date for responding, the legal and business context that is shared within that workspace, and settings enabling the platform to automatically forward messages and reminders. Further, container 1043 stores data with respect to links between messages and sub-messages, like the message IDs and the type of relation between them. Instead of the link between message and sub-messages, the link between their initiators may be maintained or a link between their collaboration spaces may be maintained. Information with respect to responses is stored in data container 1044. The message ID, workspace ID and user ID of the response may for instance be stored. Similar information is maintained with respect to discussions, like chat discussions, in data container 1045. Again, the message ID, workspace ID and user ID related to the discussion will be memorized, together with eventual detailed text reflecting the content of the discussion. At last, when messages, sub-messages or responses are updated, the update prompt container 1046 memorizes the message ID, workspace ID and detailed text related to the update.

The collaboration data 1040 are intensively used by the work area queries block 1050 that queries and stores information related to the user's work area, i.e. the GUI images that are presented to the user. For each active user and each active messages/sub-messages 1051, the user interface options and workspace details are collected in block 1050. This includes information with respect to related messages 1052 as well upstream as downstream, workspace discussions 1053 (e.g. chats related to the active message), active message discussions 1054, related documents 1055, update prompts 1056, and standard responses 1057 (e.g. frequently given responses). All this information will be displayed or made accessible in the GUI image that is generated for the active message. In addition, the work area block 1050 shall collect information with respect to the active user's contacts 1058 (like their name, relation status and activity status) and information with respect to the active user's workspaces 1059 (like their due date or overdue days) for display in the active user's workspace. Whereas the workspace information 1059 may be collected from the collaboration data block 1040, the contact information 1058 will be queried from the user and account administration block 1030. Finally, the work area block 1050 generates reports 1080 for the active user that are displayed or made accessible through his/her work area. As is indicated by 1081 in FIG. 10B, these reports may for instance be reports on overdue workspaces, reports on overdue messages, lists of messages ordered by status, lists of messages ordered by contact, reports of overdue messages ordered by contact, or statistics like average response times per contact, etc.

From the messages and workspaces, reference can be made to various information that is stored in the collaboration master and reference data block 1060. The referenced information may include workspace templates 1061 (i.e. default information for establishing workspaces like for instance the default participant rights, default context of messages, default settings for forwarding messages, etc.), wiki pages whereto the text of the messages refers (e.g. the page ID and owner, privacy settings regulating for instance that only participants that have accepted an NDA get access to the page, text details and image details), default data for updates 1063 (like for instance the update type and text details), files or documents 1064 that are related to the messages (e.g. the file ID and owner, the privacy settings regulating access to the file, the file type and details), and data with respect to predefined responses 1065 (like for instance the response ID and owner, privacy settings, text details, the unit of measure or UOM, etc.).

The solution administration block 1070 gives a non-exhaustive view on different kinds of system information that may be logged in the platform according to the invention. Examples are activity logs 1071 of the different users (wherein the login time and user ID are tracked), error logs 1072 (wherein the error code, user ID of users affected by the error, time whereon the error occurred and window wherein the error occurred are tracked), user interface libraries 1073 (like for instance language preferred by an organization or other personalization data like logo's colors, templates, etc. used by an organization), and a help and warning message container 1074 wherein information with respect to a help function of the platform is stored.

Figure 11:
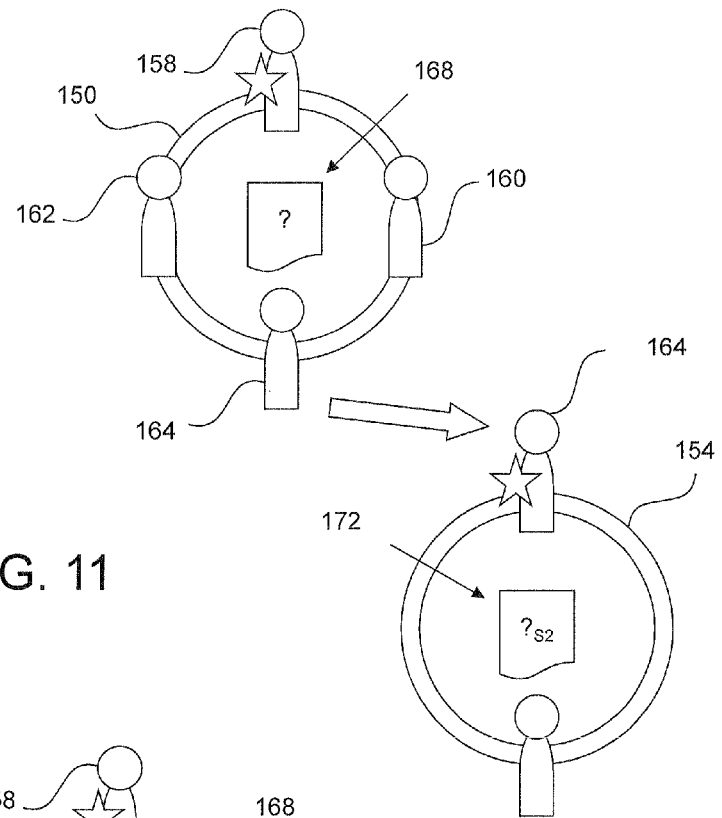
FIG. 11 illustrates a first instantiation of the collaboration method according to the present invention.

FIG. 11 illustrates a first instantiation of the collaboration method according to the present invention, in line with the message flow described here above with reference to FIG. 6. Initiator 158 creates a message 168 and collaboration space 150 wherein first degree partners 160, 162 and 164 are invited to collaborate on the message 168. Team member 164 can create a sub-message 172 or S2, as well as a collaboration space 154 with second degree partners invited to work on the sub-message 172. Team member 164 shall come back to the team 150 of first degree partners with the contribution of the newly established team 154.

Figure 12:
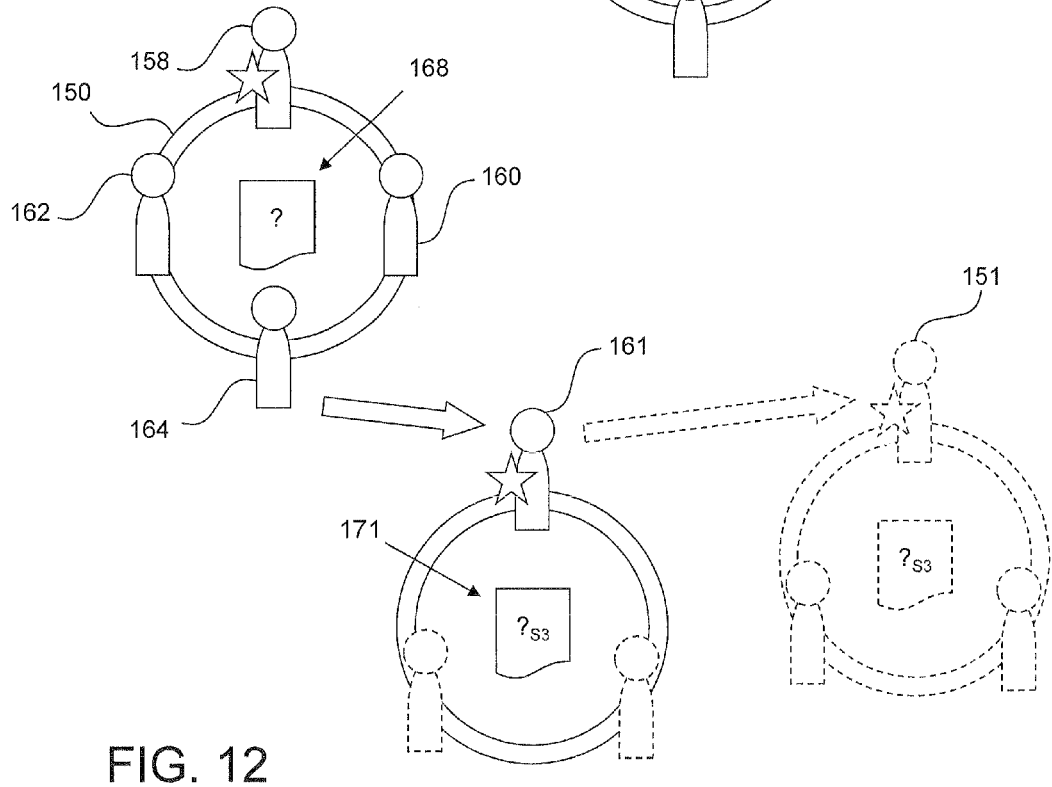
FIG. 12 illustrates a second instantiation of the collaboration method according to the present invention.

FIG. 12 illustrates an alternative instantiation of the collaboration method according to the present invention wherein the first degree partner that creates a sub-message does not necessarily coincide with the person/venture that creates the team invited to collaborate on the sub-message. Again, initiator 158 is assumed to create a message 168 and collaboration space 150 wherein first degree partners 160, 162 and 164 are invited to collaborate on the message 168. This time, team member 164 creates a sub-message 171 or S3, and only forwards the sub-message 171 to another contributor 151. It is then up to the latter contributor 151 to provide the solution himself or to establish a team that will be invited to collaborate on the sub-message S3, forward the sub-message to the team members, and come back to the first degree partner 164 with his contribution or the contribution generated through collaboration.

FIG. 13A to 13I illustrate a scenario wherein the platform and method for collaboration according to the current invention are exploited to resolve a customer initiated question 1303 that requires collaboration of the entire development and supply chain of a pencil with eraser.

Figure 13A:
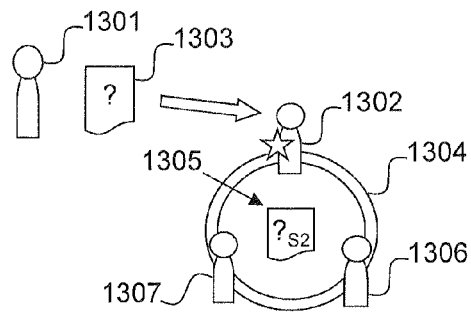
FIG. 13A-13I illustrate a scenario wherein the platform and method for collaboration according to the current invention are exploited to resolve a customer initiated question concerning the use of chemical substances in a pencil with eraser.
Figure 14A:
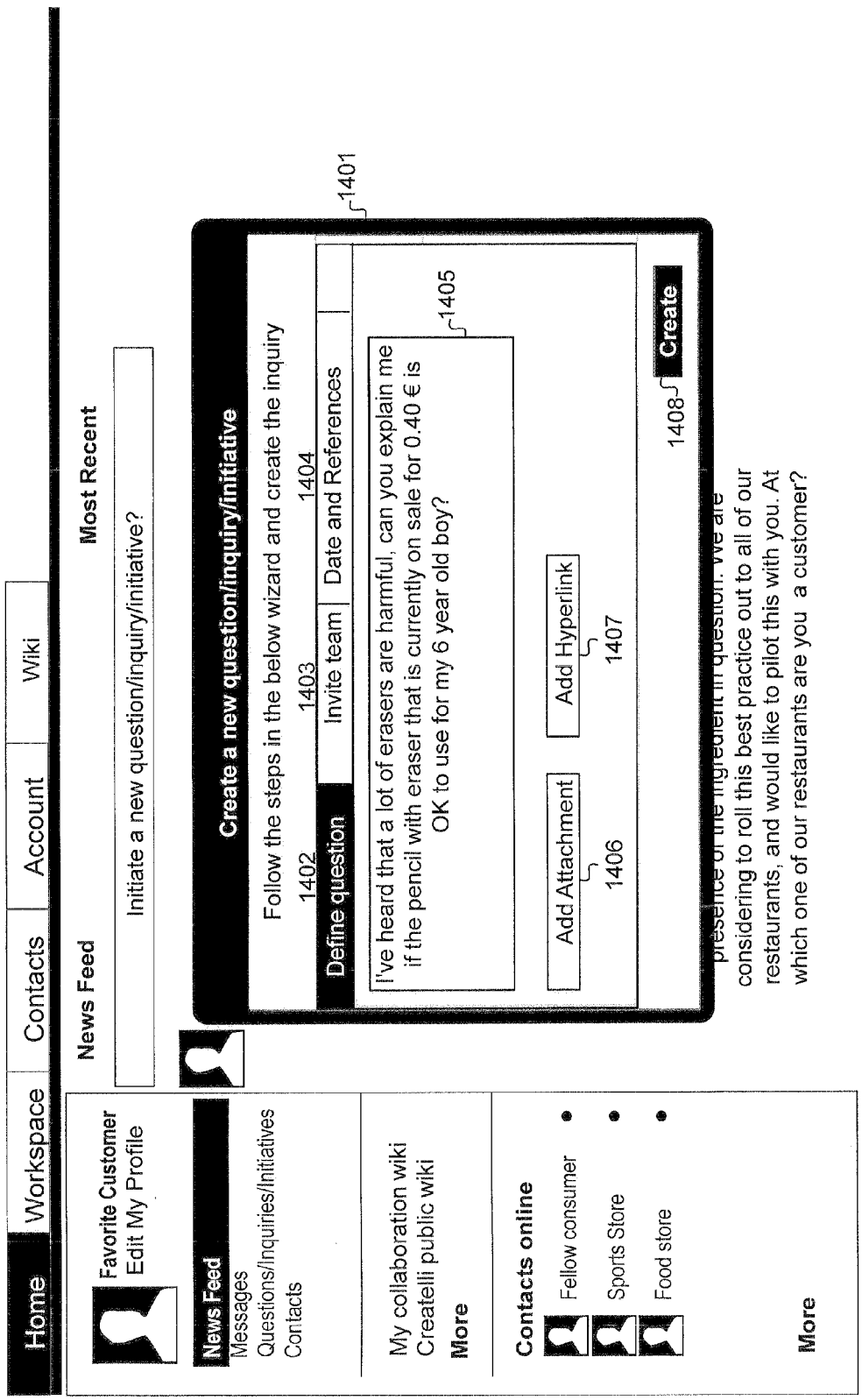

In FIG. 13A, the customer 1301 requests the store/distributor 1302 where he intends to buy a pencil with eraser to explain if the pencil with eraser that is currently on sale for 0.40 € is not harmful when used by his/her 6 year old boy. This question is denoted 1303 in FIG. 13A and is entered into the platform by customer 1301 via the work area shown in FIG. 14A. There, the customer 1301 creates a new message by opening the window 1401 in his Home work area. By selecting the "Define question" tab 1402 in window 1401, the user can enter his enquiry in text box 1404. Through tab 1403, the user can select the participants that are invited to respond, and context information like a due date and references can be associated with the message via tab 1404. Optionally, the buttons 1406 and 1407 allow adding attachments and adding hyperlinks, finally enabling the user to create a work space for the message by clicking the button 1408. The customer 1301 asks the question because he/she has heard that a lot of erasers are harmful as a result of certain chemical substances contained therein, whereas European legislation known as REACH (Registration, Evaluation, Authorization and Restriction of chemical substances) regulate the use of such chemical substances and information to be provided by industry with respect to such use.

Figure 13B:
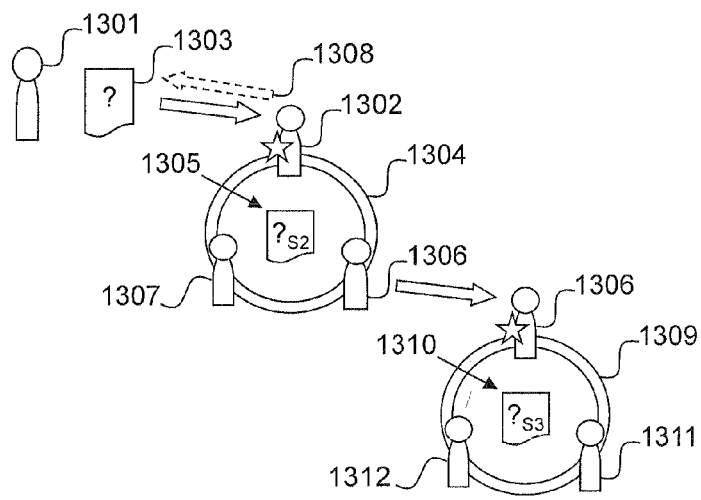

As is shown in FIG. 13B, the store/distributor 1302 sends a response 1308 to the customer 1301 thanking the customer for his/her question 1303. In the response 1308, the store 1302 informs the customer 1301 that all products sold are conform to EN (European Norms) and consequently should not contain chemical substances higher than the legally allowed limits. However, the question 1303 will be checked particularly for the pencil with eraser with the supplier thereof and the store 1302 promises the customer 1301 in its response 1308 to come back with a response.

The store/distributor 1302 that has received the request 1303 forwards the question to its supplier 1306 of the pencil with eraser, and invites also his internal REACH expert 1307 to collaborate on the issue. The distributor 1302 thereto creates a sub-message 1305 or S2 wherein the customer's question 1303 is copied, and establishes a collaboration space 1304 where the supplier 1306 of pencils with eraser and the REACH expert 1307 are invited to collaborate.

The supplier 1306 is supposed to be an importer of office supplies, who is getting more and more of these questions. He has contracted a REACH specialist 1312 to help him in dealing with these requests. The supplier creates a sub-message 1310 or S3 wherein the request 1305 received from the distributor is copied, and establishes a collaboration space 1309 wherein his REACH specialist 1312 is invited to assist in dealing with the question. The REACH specialist 1312 does some research and explains that the biggest concerns with erasers are with PVC (PolyVinyl Chloride) erasers containing the phthalate DEHP as a plasticizer. DEHP (Di-EthylHexyl Phthalate) is on the SVHC (Substances of Very High Concern) list and can be harmful for fertility, asthma, etc. when children take the eraser in their mouth. The REACH specialist 1312 also recommends the importer 1306 to check eventual presence of other substances on the SVHC list in the pencil, as well as the presence of other phthalates in the eraser and advices to find alternatives for any of these substances if present. The importer 1306 and his REACH specialist 1312 decide to invite the Asian exporter 1311 of office supplies to the collaboration space 1309 and ask the questions.

Figure 13C:
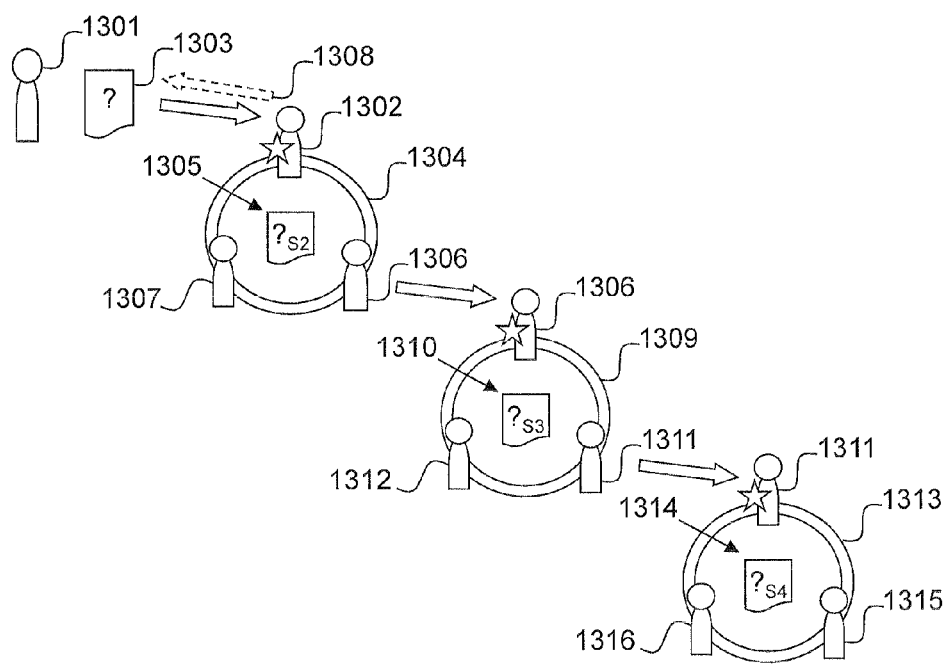

Moving to FIG. 13C, it is supposed that the exporter 1311 of the pencils only brands these pencils. The exporter 1311 therefore forwards the request to the pencil manufacturer 1315 and his quality manager 1316. The exporter 1311 thereto creates a sub-message 1314 or S4 wherein the request 1310 is copied, and establishes a collaboration space 1313 wherein the pencil manufacturer 1315 and quality manager 1316 are invited to collaborate.

Figure 13D:
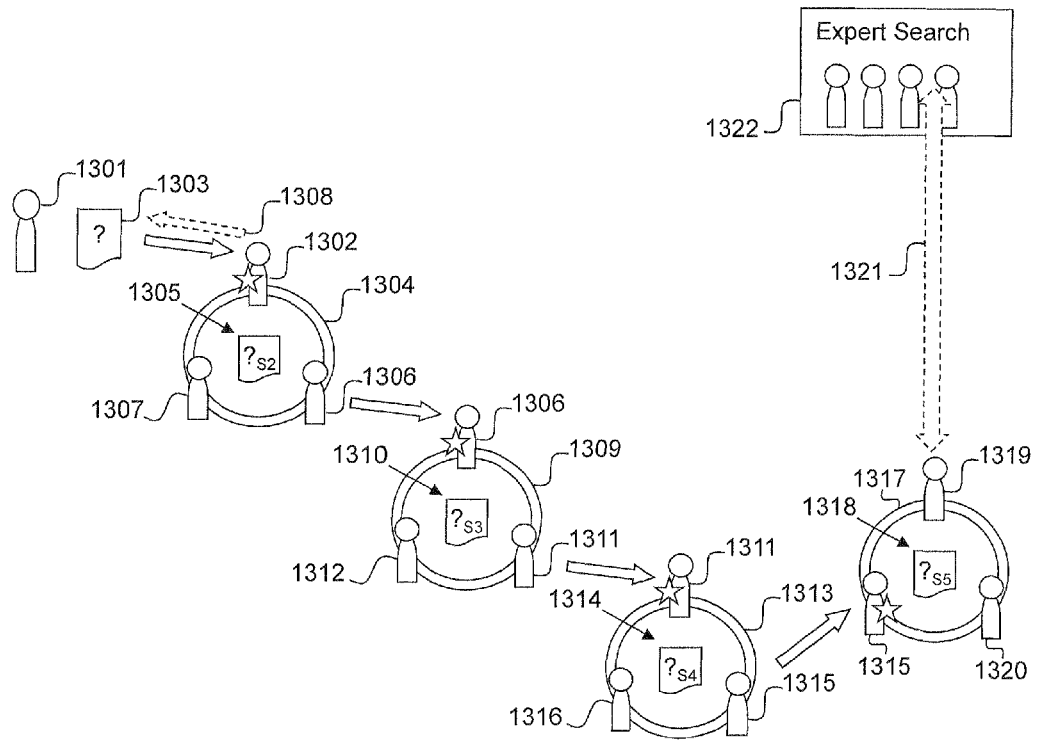

The pencil manufacturer 1315 assembles the pencils and has a lot of attention for the design, the quality of the writing of the pencils, and the wood parts, but not for the eraser which he sources from a specialist 1319 in yet another Asian country. He keeps part of the questionnaire S4 but forwards the eraser question to the supplier 1319 of the eraser raw material, as is indicated by FIG. 13D. The product manager 1320 at the pencil manufacturer 1315 explores presence of SVHC substances or phthalates in the pencil, coating, etc. Through sub-message 1318 or S5, the pencil manufacturer 1315 requests the supplier 1319 of raw material of the eraser to verify if there are any phthalates in the eraser material, as well as any other substances on the SVHC list. The pencil manufacturer 1315 indicates that the question is important considering the REACH legislation in Europe and invites the supplier 1319 of raw material of the eraser to collaboration space 1317. In case of non-compliance, the European market may be lost.

After 25 days, the distributor 1302 hasn't heard anything and sends a reminder to his supply chain, reminding of the fact that the EU legislation requires a response to the customer's question 1303 within 45 days. Sales of the product may be discontinued if no response is received from everyone involved. The distributor 1302 requests a status update and confirmation that everyone in the supply chain can respond within the requested time.

The supplier 1319 of the eraser gets the reminder and wonders what to do. He does not know much about REACH legislation but the platform supports contacting a couple of experts 1322 in this area. He asks who has experience with PVC and Phthalates, and contracts a REACH consultant. They use the chat function and some Skype™ calls to collaborate as is indicated by 1321 in FIG. 13D, and provide a reply back to the pencil manufacturer 1315.

The supplier 1319 of eraser raw material informs the manufacturer 1315 of pencils that he is not knowledgeable in detail on REACH, but the good news is that all his products are phthalate free. The supplier 1319 of eraser material doesn't use DEHP, present on the REACH SVHC list, nor DINP (Diisononyl Phthalate), not present on the SVHC list but also a phthalate, in his products since 2 years. The supplier 1319 of eraser material confirms that he also checked for other substances on the SHVC list, and declares that none of them are present in the eraser material with more than 0.1%.

Figure 13E:
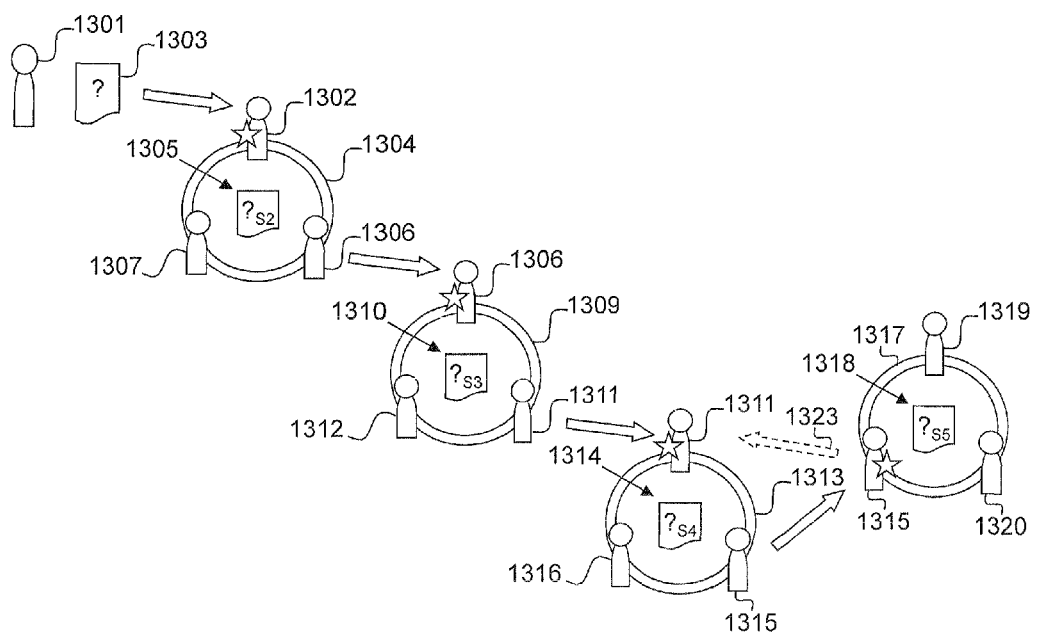

In FIG. 13E, the manufacturer of pencils 1315 informs the Asian exporter 1311 of branded pencils that the eraser is phthalate free and thus contains no DEHP not DINP nor any other phthalates. The pencil manufacturer 1315 further informs the exporter 1311 that none of the other SVHC substances are present with more than 0.1% in the pencil eraser. The response of the pencil manufacturer is denoted 1323 in FIG. 13E. To the question if the paint on the pencil can be declared non toxic, the pencil manufacturer 1315 has no response yet but confirms that he is still analyzing the paint/varnish used. Answering within the time given will not be possible, but the pencil manufacturer 1315 declares to come back within approximately four weeks.

Figure 14B:
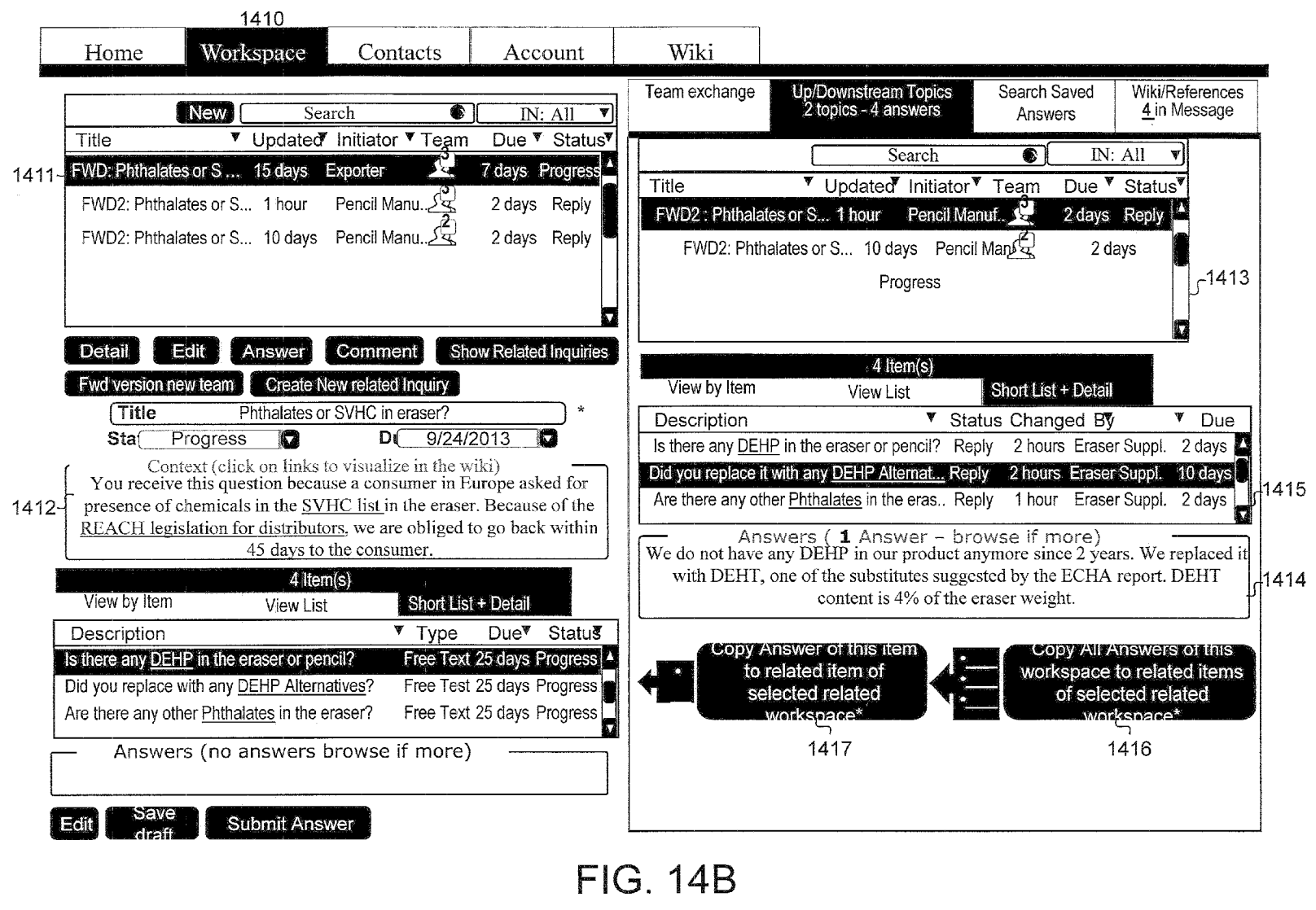
Figure 14C:
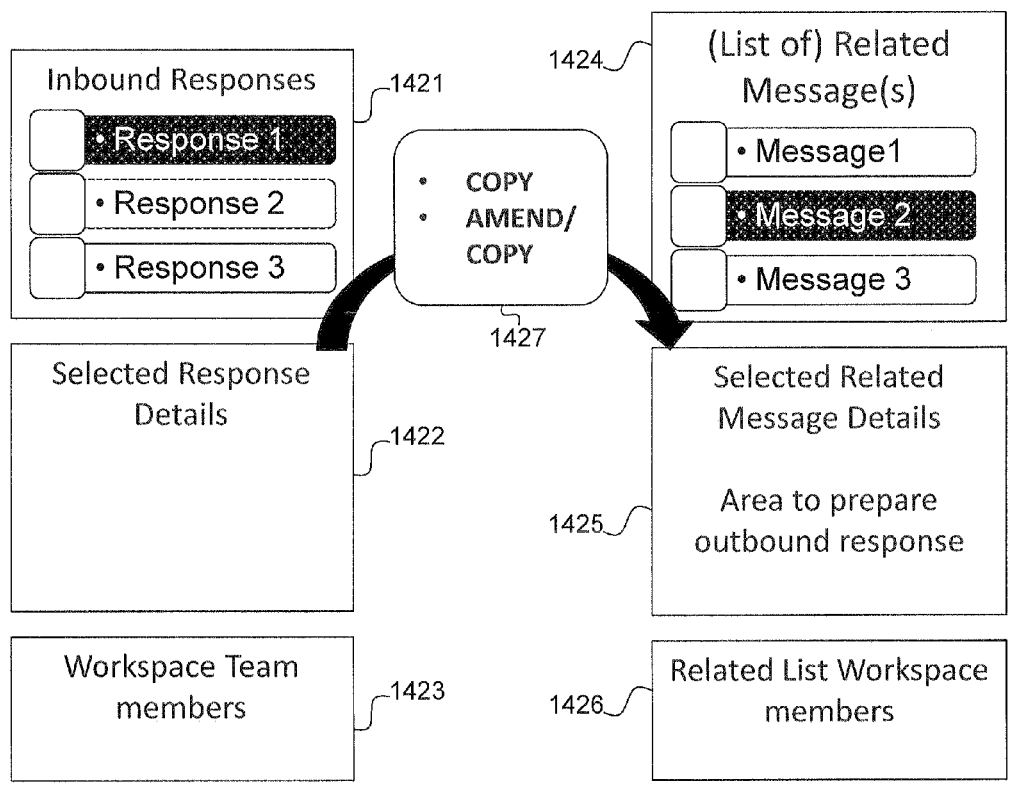

The exporter's quality manager 1316 in an internal message to the product manager indicates that it is good to see that the erasers are phthalate and SHVC free. For the rest of the pencil, the quality manager 1316 indicates that it is safe to state that there are no SVHC substances present with more than 0.1% of the pencil weight, but a check is ongoing on presence of potentially toxic substances in the pigments. If they are present, it will be less than 0.1% but at this point in time, the presence thereof can't be excluded. This is further also illustrated by FIG. 14B depicting the Workspace work area 1410 of the exporter's quality manager. In his work area 1410, the quality manager sees the inbound messages 1411 and related sub-messages 1413 and responses 1414. Details relating to a selected message like the context are displayed in 1412 whereas details related to a selected response are displayed in 1415. The selected response 1417 or all responses 1416 related to the workspace can be copied to a related message or related workspace. More generally, as shown in FIG. 14C, inbound responses 1421 may be displayed to the user. For a selected inbound response, e.g. Response 1, the response details 1422 and workspace participants 1423 may be shown. Simultaneously, a list of related messages 1424 is visualized and the details 1425 and workspace participants 1426 of the selected message, e.g. Message 2, are shown. As is indicated by 1427, the user is then given the opportunity to copy or amend and copy the selected response details 1422 into the selected related message details 1426, or the platform may do this automatically when settings allow the platform to do so.

Figure 13F:
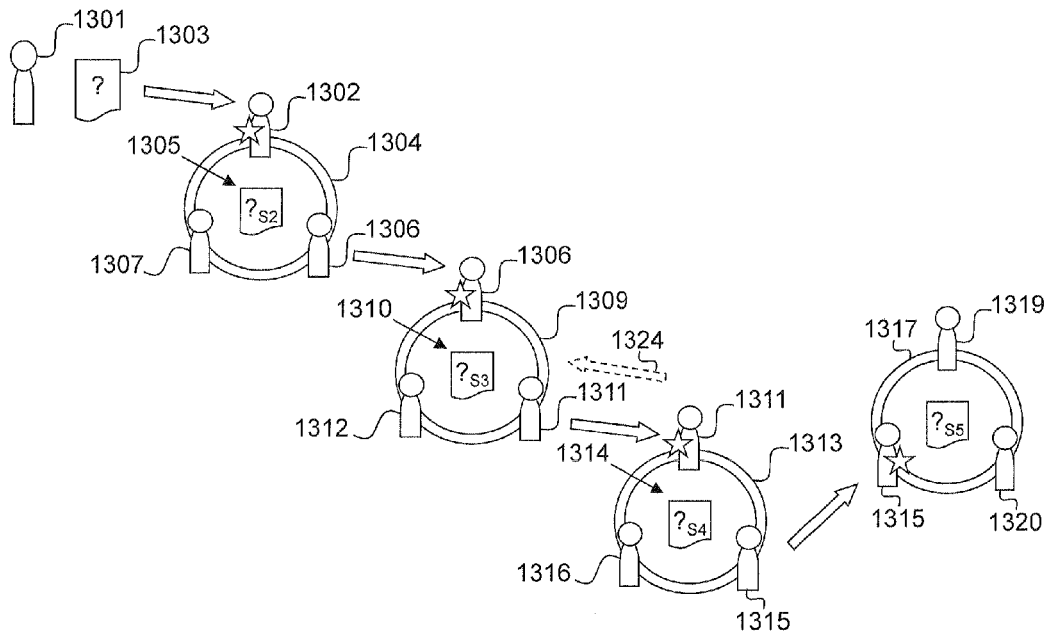

In FIG. 13F, the Asian exporter 1311 of branded pencils informs the European importer 1306 of office supplies that the eraser is phthalate free and thus contains no DEHP not DINP nor any other phthalates. None of the other SVHC substances are present with more than 0.1% in the pencil. The paint on the pencil cannot be declared non toxic. Analysis of the paint/varnish is ongoing and will not be finished within the time given, but an answer will be available within approximately four weeks. This is indicated by arrow 1324 in FIG. 13F.

Figure 13G:
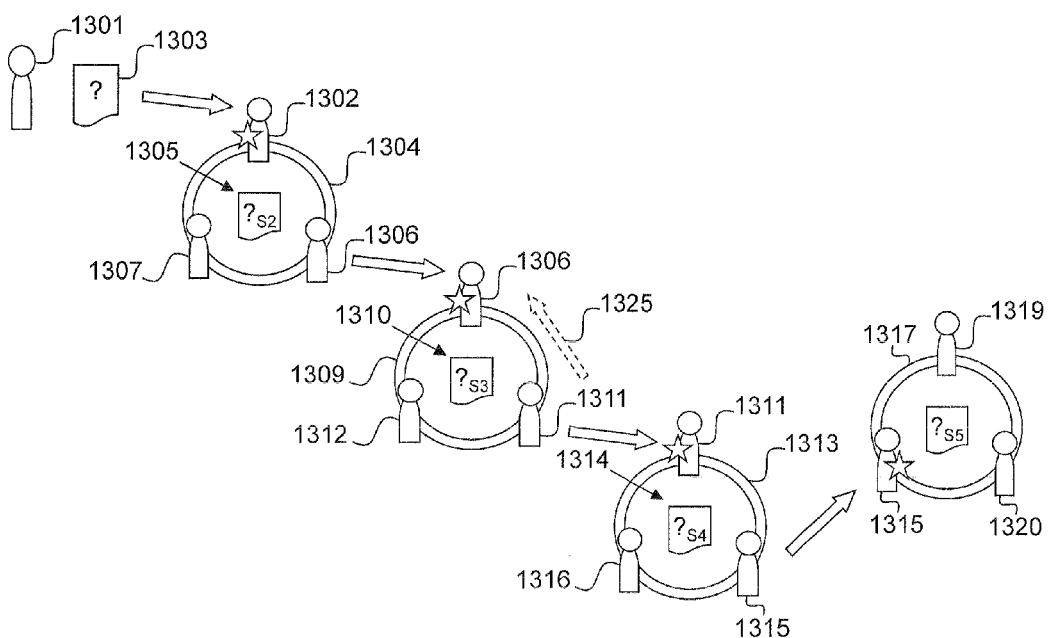

In FIG. 13G, the REACH consultant 1312 confirms via an internal message 1325 to the importer 1306 of office supplies that the conclusion is positive and the answer 1324 received from the Asian exporter 1311 can be forwarded as it did come in.

Figure 13H:
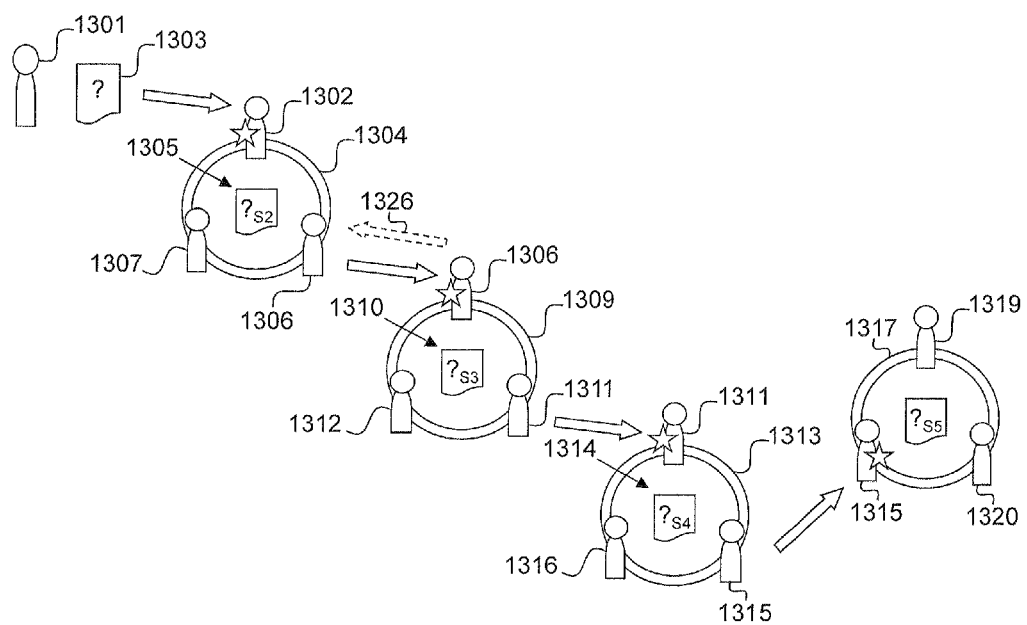

In FIG. 13H, the importer 1306 of office supplies informs the store 1302 that the eraser is phthalate free and thus contains no DEHP not DINP nor any other phthalates. None of the other SVHC listed substances are present with more than 0.1% in the pencil. The paint on the pencil cannot yet be declared non-toxic, since analysis of the paint/varnish is ongoing. Results thereof will not be available within the time given, but an answer will be given within approximately four weeks. This is the contents of response 1326 in FIG. 13H.

The REACH coordinator 1307 informs the customer liaison at the store 1302 that there are no phthalates in the eraser and as such that the store can declare to the customer that the eraser is safe. The REACH coordinator in an internal message to the customer liaison also mentions that the store has a continued improvement program on presence of any toxic products.

Figure 13I:
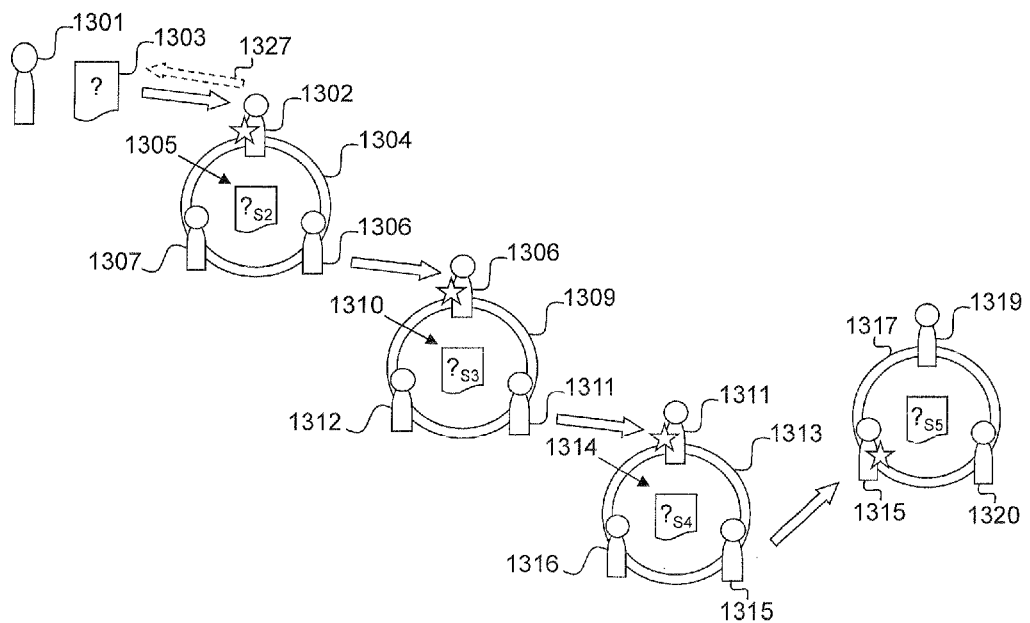

In FIG. 13I, the customer liaison at the store 1302 at last informs the customer that double checks with the suppliers have taken place confirming that he eraser of the pencil on sale is phthalate free. The customer consequently should not worry about his/her 6 year old boy using the eraser. This is indicated by arrow 1327.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent specification that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. It is to be understood that the terms so used are interchangeable under appropriate circumstances and embodiments of the invention are capable of operating according to the present invention in other sequences different from the one(s) described or illustrated above.

The invention claimed is:

1. A computer implemented system, comprising:
a message accessible at least to a creating user of the message and to each member of an initial invited user group, the initial invited user group comprising one or more users invited to access the message;
one or more sub-messages of the message, each sub-message of the one or more sub-messages being accessible at least to a creating user of the sub-message and to each member of an additional invited user group, the additional invited user group comprising one or more users invited to access the sub-message;
an initial plurality of permissions controlling access to the message, the initial plurality of permissions comprising one or more automatically assigned permissions enabling the creating user of the message to send invitations to access the message, and further comprising one or more additional permissions that either permit or deny each member of the initial invited user group the ability to create one or more additional sub-messages of the message;
for each of the one or more sub-messages, an additional plurality of permissions controlling access thereto, the additional plurality of permissions comprising one or more automatically assigned permissions enabling the creating user of the sub-message to send invitations to access the sub-message, and further comprising one or more additional permissions that either permit or deny each member of the additional invited user group the ability to create one or more additional sub-messages of the message;
wherein the system enables the identity of each member of any invited user group to be concealed from any member of any different invited user group.

2. The computer implemented system of claim 1, further comprising, for each of the message and the one or more sub-messages of the message, one or more communication mechanisms for enabling communication among any members of each invited user group and the creating user.

3. The computer implemented system of claim 1, wherein any creating user of the one or more sub-messages of the message is enabled to submit a response.

4. The computer implemented system of claim 3, wherein the response comprises any one or more of an answer, a confirmation, additional input, a question, or a reply.

5. The computer implemented system of claim 1, wherein the identity of each member of at least one invited user group is concealed from any member of any different invited user group.

6. The computer implemented system of claim 1, wherein the identity of each member of at least one invited user group is not concealed from the members of one or more different invited user group.

7. The computer implemented system of claim 1, wherein each of the one or more sub-messages is created either from the message or from a preceding sub-message of the one or more sub-messages, and further wherein each sub-message comprises a modified or unmodified copy of either the message or the preceding sub-message from which it was created.

8. The computer implemented system of claim 1, wherein each sub-message of the one or more sub-messages is created either from the message or from a preceding sub-message of the one or more sub-messages, and further wherein each sub-message comprises all or a subset of either the message or the preceding sub-message from which the sub-message was created.

9. The computer implemented system of claim 1, wherein the message and the one or more sub-messages form at least one of a data chain, the data chain comprising a set of successively linked data copies, wherein a first data copy of the set of successively linked data copies comprises the message and further wherein each successive data copy of the set of successively linked data copies comprises one of the one or more sub-messages.

* * * * *